(12) United States Patent
Chowdhury et al.

(10) Patent No.: US 12,482,566 B2
(45) Date of Patent: Nov. 25, 2025

(54) SYSTEMS AND METHODS FOR PREDICTING CANCER METASTASIS AND SCREENING OF DRUGS

(71) Applicant: MESTASTOP SOLUTIONS PRIVATE LIMITED, Bangalore (IN)

(72) Inventors: Arnab Roy Chowdhury, Bangalore (IN); Debabani Roy Chowdhury, Bangalore (IN); Manoj Pandre, Hospet (IN); Samrat Roy, Bangalore (IN); Sundarajan Kannan, Bangalore (IN)

(73) Assignee: MESTASTOP SOLUTIONS PRIVATE LIMITED, Bangalore (IN)

( * ) Notice: Subject to any disclaimer, the term of this patent is extended or adjusted under 35 U.S.C. 154(b) by 253 days.

(21) Appl. No.: 18/026,630

(22) PCT Filed: Sep. 17, 2021

(86) PCT No.: PCT/IN2021/050915
§ 371 (c)(1),
(2) Date: Mar. 16, 2023

(87) PCT Pub. No.: WO2022/059026
PCT Pub. Date: Mar. 24, 2022

(65) Prior Publication Data
US 2023/0343452 A1    Oct. 26, 2023

(30) Foreign Application Priority Data
Sep. 21, 2020 (IN) .............................. 202041040890

(51) Int. Cl.
*G16H 50/20* (2018.01)
*G01N 33/50* (2006.01)
*G16B 5/20* (2019.01)
*G16B 40/20* (2019.01)

(52) U.S. Cl.
CPC ......... *G16H 50/20* (2018.01); *G01N 33/5011* (2013.01); *G16B 5/20* (2019.02); *G16B 40/20* (2019.02)

(58) Field of Classification Search
None
See application file for complete search history.

(56) References Cited

U.S. PATENT DOCUMENTS

| | | | | |
|---|---|---|---|---|
| 6,228,345 B1 * | 5/2001 | Ossowski | ............ | C12Q 1/6886 424/9.1 |
| 7,618,772 B2 * | 11/2009 | Kuo | ..................... | C12Q 1/6886 435/7.1 |
| 2003/0215528 A1 * | 11/2003 | Graham | ................. | A61K 45/06 514/102 |

(Continued)

OTHER PUBLICATIONS

Choi et al., Hydrodynamic shear stress promotes epithelial-mesenchymal transition by downregulating ERK and GSK3β activities, Breast Cancer Research (2019) 21:6 https://doi.org/10.1186/s13058-018-1071-2.*

*Primary Examiner* — David J Stoltenberg
(74) *Attorney, Agent, or Firm* — Jose Cherson Weissbrot

(57) ABSTRACT

Systems and methods for predicting cancer metastasis and screening of drugs. Embodiments herein disclose methods and systems for determining the ability of at least one cancer cell to metastasize and for screening of compounds/drugs for their potential use in inhibiting cancer metastasis.

10 Claims, 37 Drawing Sheets

(56) References Cited

U.S. PATENT DOCUMENTS

| | | | |
|---|---|---|---|
| 2004/0214783 A1* | 10/2004 | Terman | A61K 39/4622 |
| | | | 514/33 |
| 2006/0057138 A1* | 3/2006 | Wood | A61P 35/04 |
| | | | 530/388.22 |
| 2008/0312199 A1 | 12/2008 | Glinsky | |
| 2010/0184093 A1* | 7/2010 | Donovan | G16B 25/00 |
| | | | 435/287.1 |
| 2012/0041683 A1* | 2/2012 | Vaske | G16B 25/10 |
| | | | 706/14 |
| 2014/0206559 A1* | 7/2014 | Whitesides | G01N 33/574 |
| | | | 435/7.1 |
| 2014/0294729 A1* | 10/2014 | Gupta | A61P 35/00 |
| | | | 506/10 |
| 2017/0038384 A1* | 2/2017 | Manchado | G01N 33/5748 |
| 2018/0357364 A1* | 12/2018 | Bagnard | G16H 20/10 |
| 2018/0358128 A1* | 12/2018 | Bagaev | C12Q 1/6886 |
| 2019/0050532 A1* | 2/2019 | Brown | G16B 40/20 |
| 2019/0234937 A1* | 8/2019 | Wang | A61K 35/12 |
| 2019/0282708 A1 | 9/2019 | Luo et al. | |
| 2019/0367884 A1* | 12/2019 | Satchi-Fainaro | C12N 5/0691 |
| 2021/0155932 A1* | 5/2021 | Billy | A61K 47/18 |
| 2021/0205370 A1* | 7/2021 | Aberman | C12N 5/0062 |
| 2021/0340238 A1* | 11/2021 | Datta | A61P 13/12 |

* cited by examiner

HCT 116

No FBS   + FBS

HCT116 Invasion

Lambert et. al., Cell, 2017, 168, 670-691

Clustered Invasion   Single cell Invasion

RA effect on expression of Vimentin and E-Cadherin levels in SW480 clone 1C3

Overexpression strategy to convert non-met cells to met cells

CRISPR CAS 9 to convert met cells to non-met

SYSTEMS AND METHODS FOR PREDICTING CANCER METASTASIS AND SCREENING OF DRUGS

CROSS REFERENCE TO RELATED APPLICATION

This application is based on and derives the benefit of Indian Provisional Application 202041040890, filed on 21 Sep. 2020, the contents of which are incorporated herein by reference.

TECHNICAL FIELD

Embodiments disclosed herein relate to metastatic potential of a primary carcinoma, and more particularly to systems and methods for determining the ability of one or more cancer cells to metastasize and for screening of drugs for their potential use in inhibiting cancer metastasis.

BACKGROUND

Cancer metastasis is a major cause of cancer mortality that accounts for about 90% of cancer deaths. Metastasis involves spread of cancer cells from primary tumor site to surrounding and distant organs.

Cancer survival rates have increased significantly over the years, which can be basically credited to early diagnosis and cancer growth inhibition. However, limited progress has been made in the field of cancer metastasis.

Current treatments for cancer metastasis predominantly include surgery, followed by chemotherapy and radiotherapy. The biggest challenge for clinicians is their inability to understand which primary tumor patients will develop metastasis, even after successful surgical intervention and chemotherapy. Adding to that, the lack of understanding of the timeline, as to when the patient will develop metastasis, exponentially increases this challenge.

The three major myths that have contributed to the lack of understanding of the metastatic process are as follows:
i) Dissemination of cancerous cells is directly proportional to tumor size. PET SCANs can detect tumors having more than $10^9$ cells. The most sensitive liquid biopsy can detect greater than $10^5$ cells present in the blood. Hence, even if there are hundreds or thousands of tumor cells already metastasized in the blood, on their way to a secondary tissue, clinically they may go undetected. Some of these cells survive the body's immune system and successfully hide in other tissues, remaining dormant and staying undetected, only to grow to a secondary tumor at some point of time. Such patients are clinically declared to be cancer free, till the time the tumor recurs in a different area (metastasis, 0.01% efficient process) or the same area (recurrence) and are visible by liquid biopsy or PET SCAN, which is probably too late.
ii) Metastasis is heterogenous for different cancers, as a result of different late-stage mutations.
iii) Cellular plasticity is not relevant. Unfortunately, no tumor agnostic prediction or diagnostic tests are available till date for all epithelial carcinomas that can predict the probability of the primary tumor to metastasize. Further, in the last 25 years, only one anti metastatic drug has been approved by FDA, from the 220+ drugs that were approved for cancer. This can be attributed to the limited understanding of the complex metastatic process. Current research has only unveiled a part of this complexity and hence as a result, all drug discovery efforts till date have been primarily focused on targeting of the cancer cell's ability to move away from the primary tumor site, adhere and invade the epithelial cell layer.

OBJECTS

The principal object of embodiments herein is to disclose methods and systems for determining the ability of at least one cancer cell to metastasize and for screening of drugs for their potential use in inhibiting cancer metastasis.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
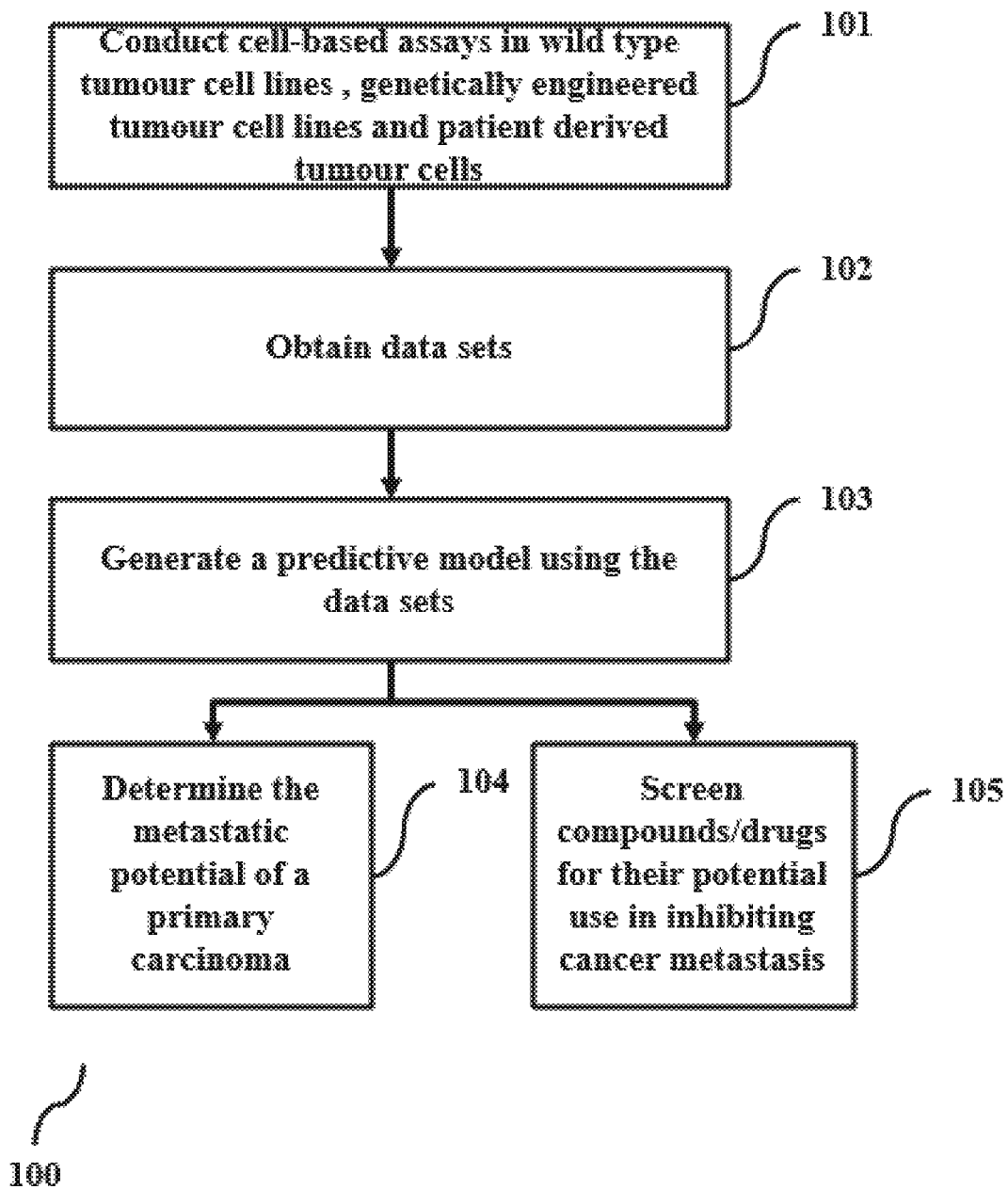
FIG. 1 depicts a method for determining the ability of at least one cancer cell to metastasize and for screening of drugs for their potential use in inhibiting cancer metastasis, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve methods and systems for determining the ability of at least one cancer cell to metastasize and for screening of drugs for their potential use in inhibiting cancer metastasis. Referring now to the drawings, and more particularly to FIGS. 1 through 23, where similar reference characters denote corresponding features consistently throughout the figures, there are shown embodiments.

The following terms have been used herein:

Primary Carcinoma: The term "primary carcinoma" refers to the original site in the body where cancer initially began.

Cancer Metastasis: The term "cancer metastasis" refers to spread of cancer cells from a primary carcinoma site to a secondary site.

Cancer stem cell: The term "cancer stem cell" refers to subpopulation of cells within a tumor capable of displaying dormancy, self-renewal, differentiation, proliferation, and tumorigenicity.

Growing cell type: The term "growing cell type" refers to the cells having predominant characteristics of an epithelial cell. The growing cell type is highly proliferating, chemosensitive and do not have any significant cancer stem cell like properties.

Moving cell type: The term "moving cell type" refers to the cells having predominant characteristics of a mesenchymal cell. The moving cell type is less proliferating, chemoresistant and have significant cancer stem cell like properties.

Normalization: The term "normalization" refers to a scaling technique in which numeric values of a dataset are shifted and brought to a common scale, without distorting the differences in the ranges of values.

Screening of drugs: The term "screening of drugs" can be interchangeably used with the term "screening of compounds" and refers to identifying compound(s) having inhibitory potency towards cancer metastasis.

Inhibitory potency: The term "inhibitory potency" refers to potency of compound(s) to inhibit cancer metastasis.

Embodiments herein disclose methods and systems for determining the ability of at least one cancer cell to metastasize and for screening of drugs for their potential use in inhibiting cancer metastasis. Embodiments herein disclose a computer implemented tool for predicting the metastatic potential of a primary carcinoma. Embodiments herein disclose a method for predicting the metastatic potential of a primary carcinoma. Embodiments herein disclose a tool for screening drugs for their potential use in inhibiting cancer metastasis.

FIG. 1 is a flowchart depicting the process of determining the ability of at least one cancer cell to metastasize and for screening of drugs for their potential use in inhibiting cancer metastasis. In step 101, cell-based assays are conducted in wild type tumor cell lines, genetically engineered tumor cell lines and patient derived tumor cells or tissues samples. Each of these assays can be considered as an in-vitro biological mimicry for studying key cellular characteristic and studying of the physiological process of metastasis, wherein the physiological process that includes multiple steps, which are collectively responsible for metastasis. The assays can be broken into five major groups namely group A, group B, group C, group D, and group E.

Figure 3A:
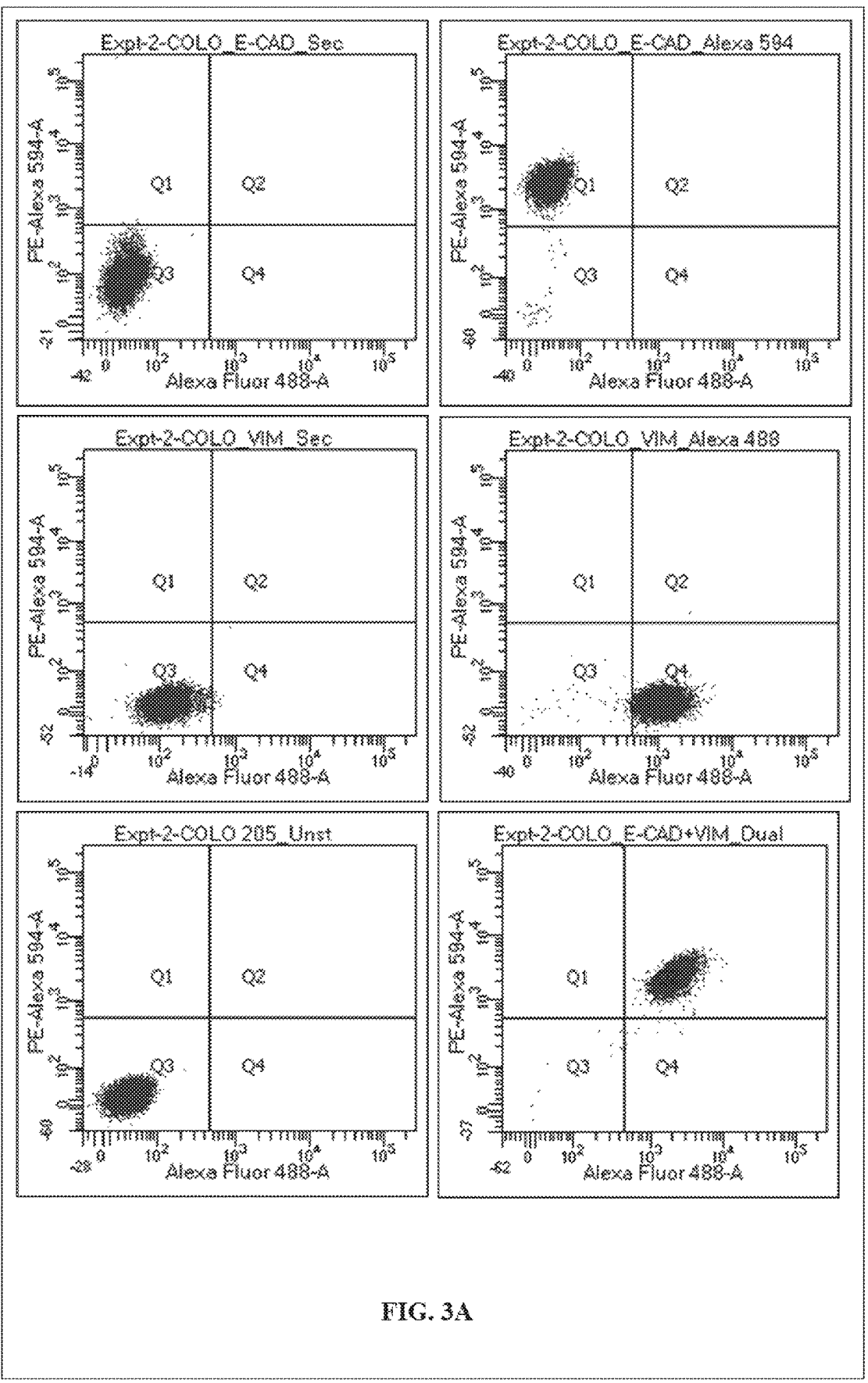
FIGS. 3A and 3B and 3C depict results of an assay, epithelial to mesenchymal ratio (A2), for Epithelial marker E-Cadherin (AF 594) and Mesenchymal marker Vimentin (AF 488) in a tumor, according to embodiments as disclosed herein.
Figure 3B:
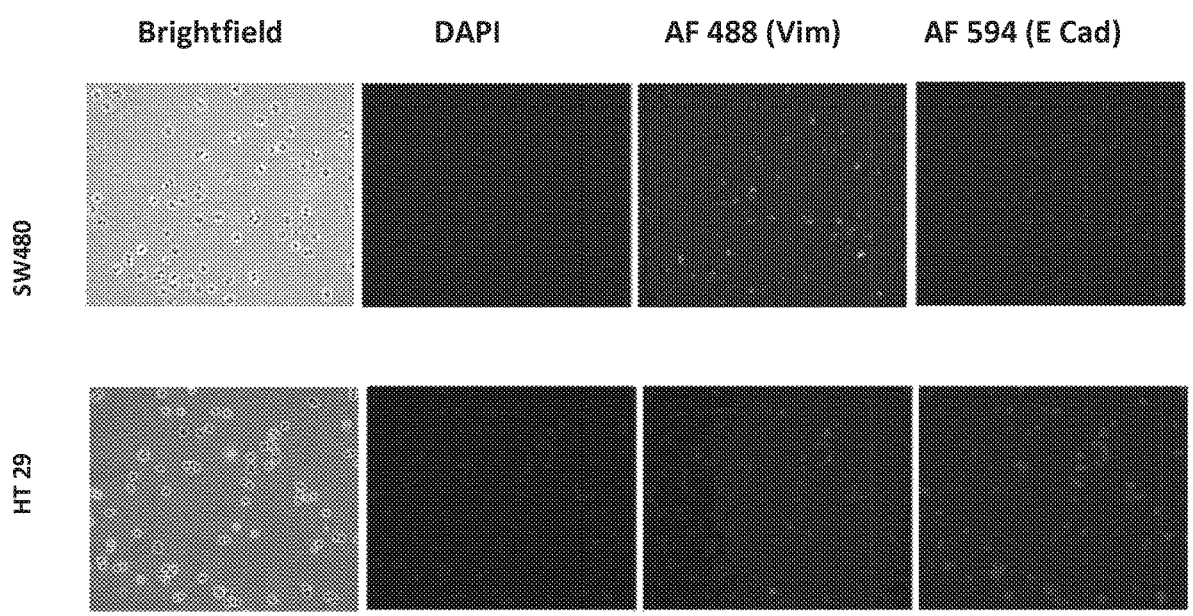
Figure 3C:
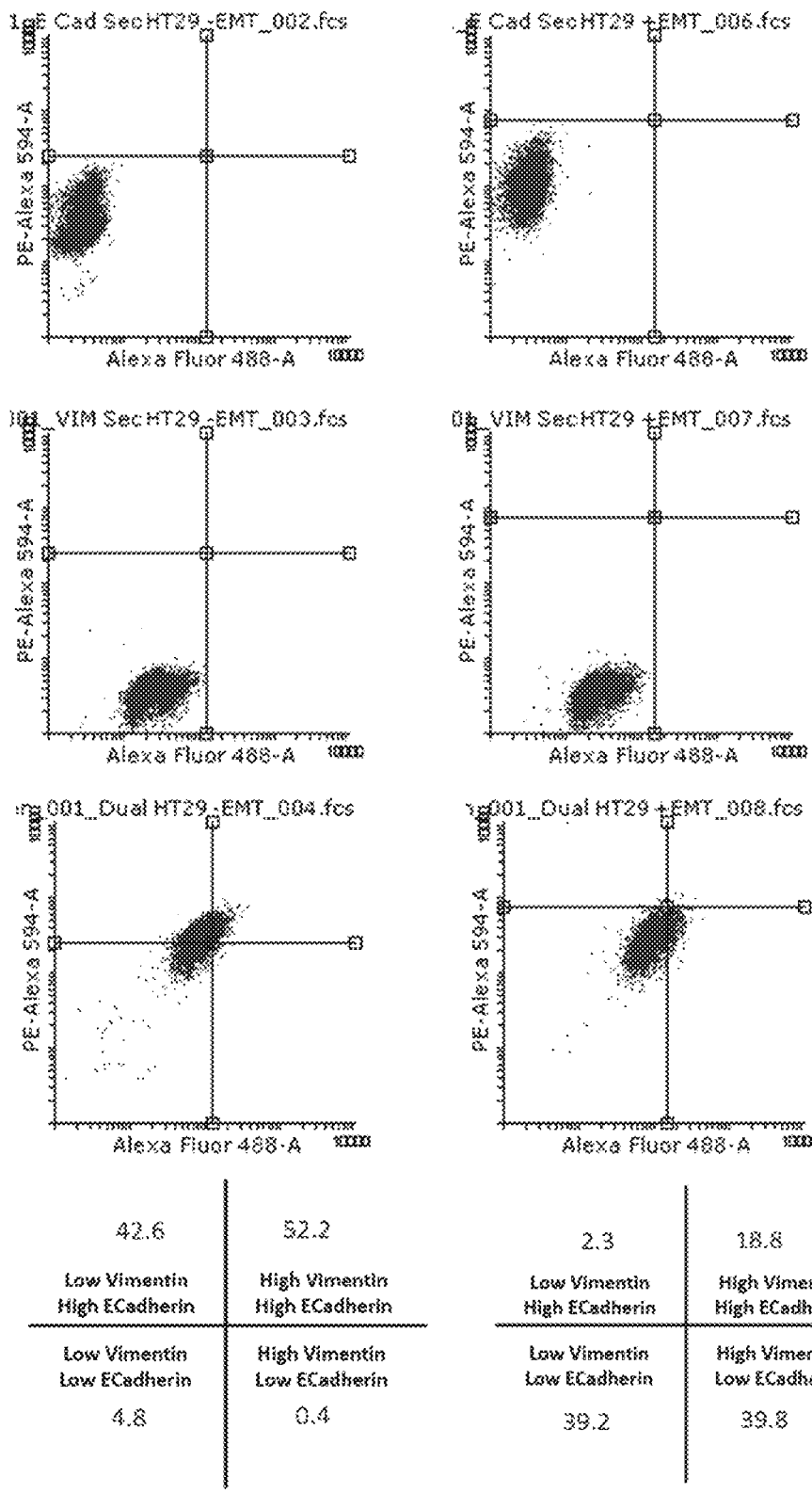
Figure 4:
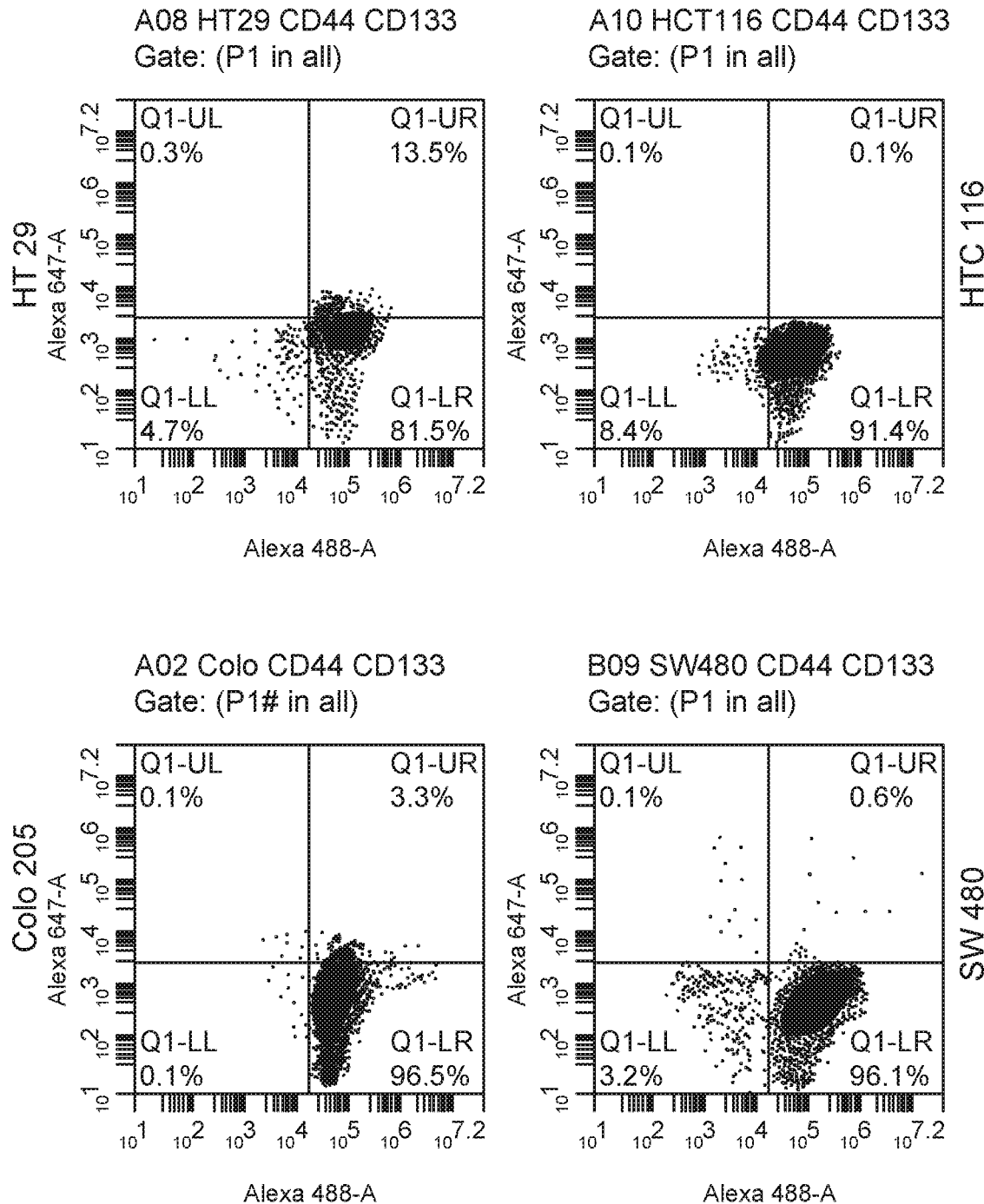
FIG. 4 depict results of an assay, stemness of the cell (A3), for stemness markers CD 133 (AF 647) & CD 44 (AF 488), according to embodiments as disclosed herein.
Figure 5A:
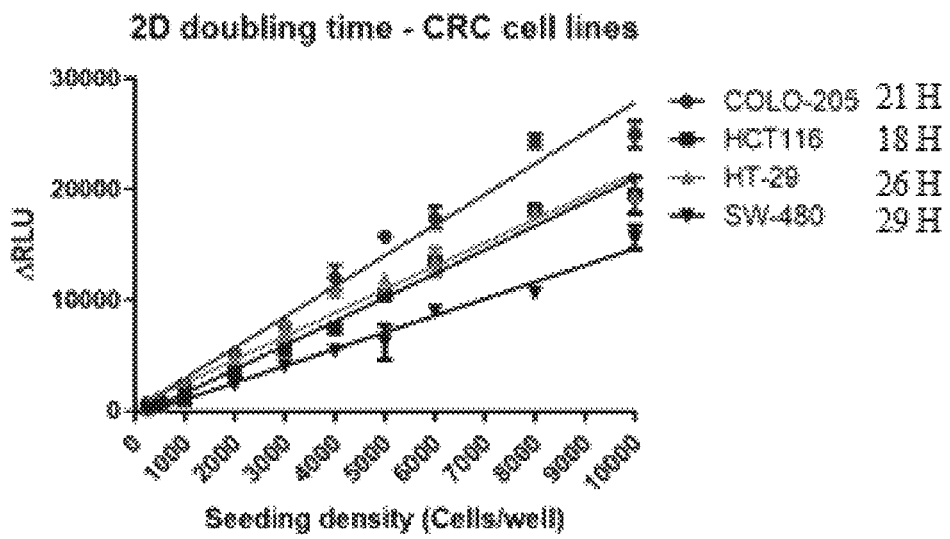
FIGS. 5A and 5B depict results of an assay, doubling time of tumor (A4), for CRC cell lines and HT 29 spheroids, respectively, according to embodiments as disclosed herein.
Figure 5B:
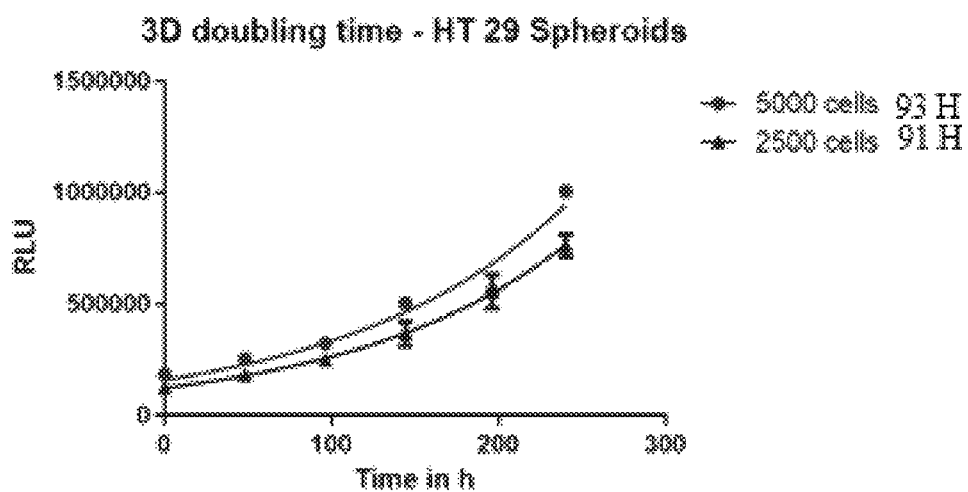

Group A includes characterization of cells. For characterization of cells (Group A), the following parameters are evaluated; chemosensitivity (A1) (as depicted in FIG. 2), the epithelial to mesenchymal ratio in a tumor (A2) (as depicted in FIGS. 3A, 3B and 3C), stemness of the cell (A3) (as depicted in FIG. 4) and doubling time of tumor (A4) (as depicted in FIGS. 5A and 5B).

Figure 2:
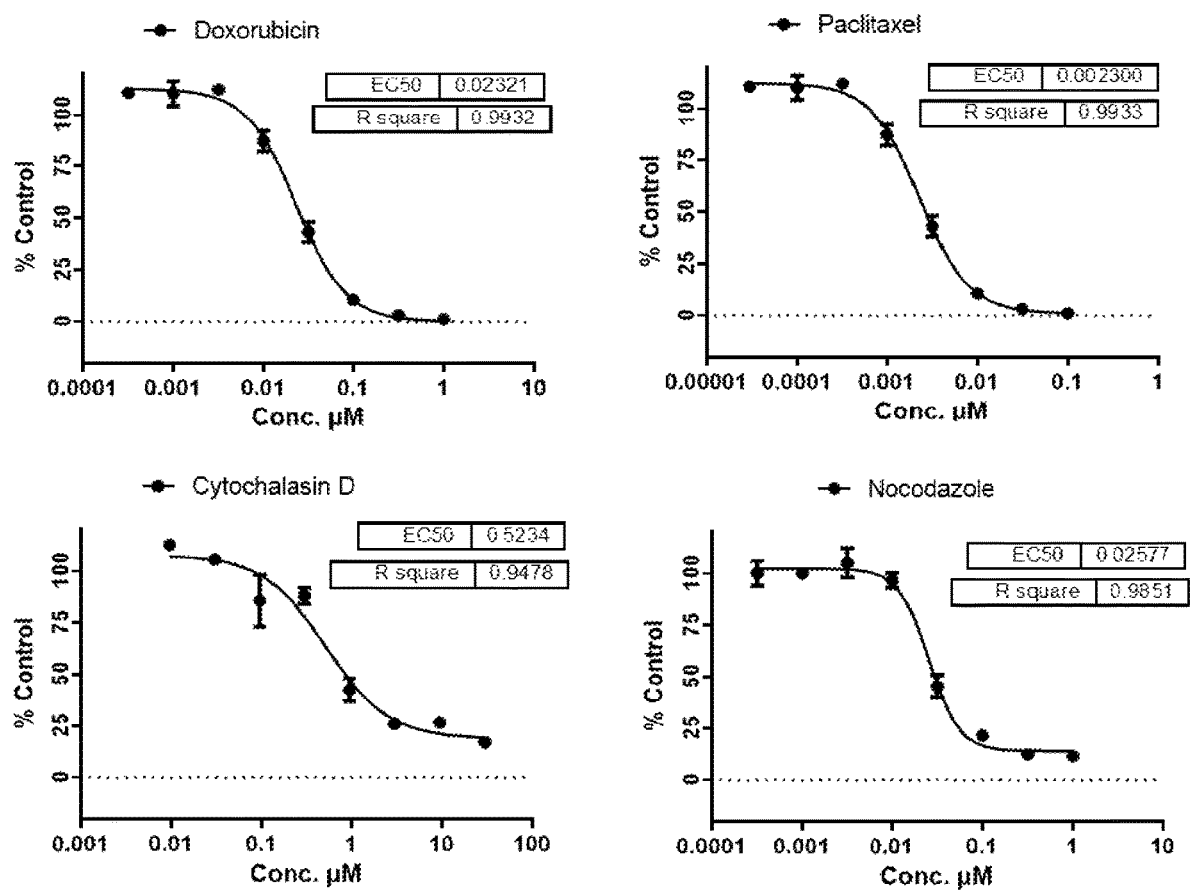
FIG. 2 depict results of an assay, chemosensitivity (A1), for chemotherapeutic drugs Dxorubicin, Paclitaxel, Cytochalasin D, and Nocodazole, respectively, according to embodiments as disclosed herein.

FIG. 2 is representation depicting chemosensitivity assay (A1), for chemotherapeutic drugs Dxorubicin, Paclitaxel, Cytochalasin D, and Nocodazole, respectively. FIGS. 3A, 3B and 3C are representations depicting epithelial to mesenchymal ratio assay (A2), for Epithelial marker E-Cadherin (AF 594) and Mesenchymal marker Vimentin (AF 488) in a tumor. FIG. 4 is representation depicting assay for stemness of the cell (A3), for stemness markers CD 133 (AF 647) & CD 44 (AF 488). FIGS. 5A and 5B are representations depicting assay for doubling time of tumor (A4), for CRC cell lines and HT 29 spheroids, respectively.

Chemosensitivity (A1) is evaluated by checking the tumor cell's ability to survive upon treatment with multiple chemotherapeutic drugs. Chemo resistance is proportional to stemness and invasiveness. Chemosensitivity is measured by treating the cells with a compound and measuring the number of live cells remaining after 96 hours, as compared to untreated cells. In an embodiment herein, WST-8 (water soluble tetrazolium salt) forms formazan dye, which can be used as a measure of dehydrogenase activity of live cells). In an embodiment herein, fluorescent DNA binding dye can be used to measure the cellular DNA content. In an embodiment herein, ATP content can be used as a measure of viable cells.

The epithelial to mesenchymal ratio in a tumor (A2) of the tumor cells is measured by comparing the total percentage of mesenchymal markers to the total percentage of epithelial markers to generate a Plasticity Ratio (PR). PR can help in characterizing cells vis-a-vis invasiveness & growth properties, (PR ∝invasiveness). The mesenchymal markers that are analyzed, include Vimentin and/or N cadherin. The epithelial markers that are analyzed, include E-cadherin and/or EpCam. A ratio <0.7 indicates epithelial characteristics of the cells and a ratio >1 indicates mesenchymal properties of the cells. An increase in this ratio suggests increasing invasiveness of the tumor cell. Embodiments herein can evaluate the transition from the epithelial form to the mesenchymal form by measuring the same epithelial markers and mesenchymal markers to determine the plasticity ratio (PR) ratio. Embodiments herein can measure the epithelial to mesenchymal ratio and PR ratio using flow cytometry and immunofluorescence. In the experimental data depicted in FIGS. 3A, 3B and 3C, the reagent used is a cocktail of proteins promoting epithelial to mesenchymal transition, the Epithelial marker is E-Cadherin (AF 594), and the Mesenchymal marker is Vimentin (AF 488). Table 1 provides the plasticity ratios determined for Epithelial marker E-Cadherin (AF 594) and Mesenchymal marker Vimentin (AF 488).

Table 1 showing plasticity ratios (PR) for E-Cadherin (AF 594) and Vimentin (AF 488).

| Cell line | E-Cadherin | Vimentin | PR |
| --- | --- | --- | --- |
| HT 29 | 95.6 | 50.9 | 0.532 |
| HCT 116 | 42.2 | 70.8 | 1.678 |
| Colo 205 | 95.1 | 98.2 | 1.033 |
| SW 480 | 30.5 | 99.2 | 3.252 |

Metastatic cells are stem like, analysis of patient samples in conjunction with PR gives a tighter correlation of plasticity. Cancer stem cells (CSCs) are defined by their ability for self-renewal and multipotency. The CSC hypothesis states that, although CSCs represent a rare population of cells within a tumor, their high tumorigenic capacity drives tumorigenesis. Due to their intrinsic stem cell-like properties, CSC proliferation generates more CSCs, and all the differentiated cell types that compose the bulk of the tumor. Non-CSCs in the tumor have been shown to proliferate at a faster rate than CSCs, but have low tumor-initiating potential. A key therapeutic intervention for metastasis will be to prevent cells from being plastic, i.e., change from the epithelial form to the moving mesenchymal form. The amount of stemness (A3) in tumor cells can be measured by analyzing stem cell markers, including, but not limited to, CD133, CD 44, CD24, CD166, CD44+, EpCAM, ABCG2, and ALDH1A1, by flow cytometry and immunofluorescence.

The Doubling time of tumor (A4) is the total time taken by the tumor to double the number of cells. A higher doubling time would indicate the presence of higher stemness resulting in increased invasive behavior. Metastatic or moving cells, have comparatively lower proliferation rate. The doubling time is measured by adding a labelled dye into cells and monitoring the incorporation of the labelled dye into the DNA of the growing cells. In an embodiment herein, WST-8 (water soluble tetrazolium salt) forms formazan dye, which can be used as a measure of dehydrogenase activity of live cells). In an embodiment herein, fluorescent DNA binding dye can be used to measure the cellular DNA content. In an embodiment herein, ATP content can be used as a measure of viable cells.

Figure 6A:
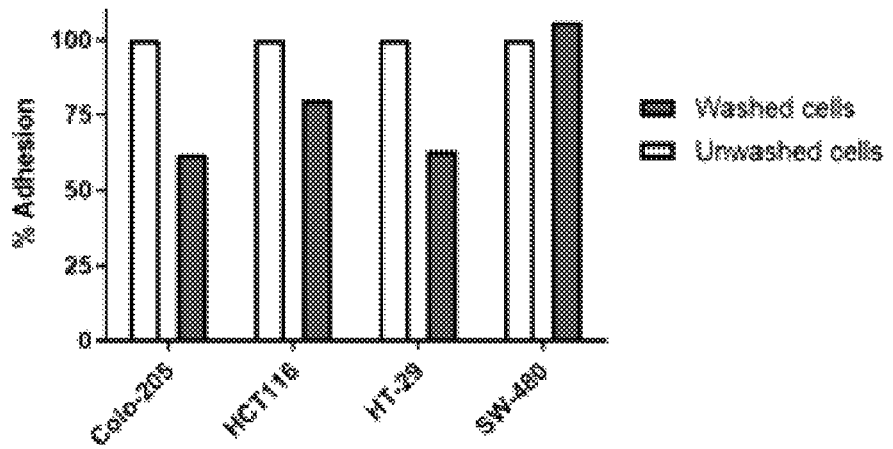
FIGS. 6A and 6B depict results of an assay, adhesion (B5) of tumor, showing adhesion percentages in colon cancer cells and effect of heparin on adhesion, respectively, according to embodiments as disclosed herein.
Figure 6B:
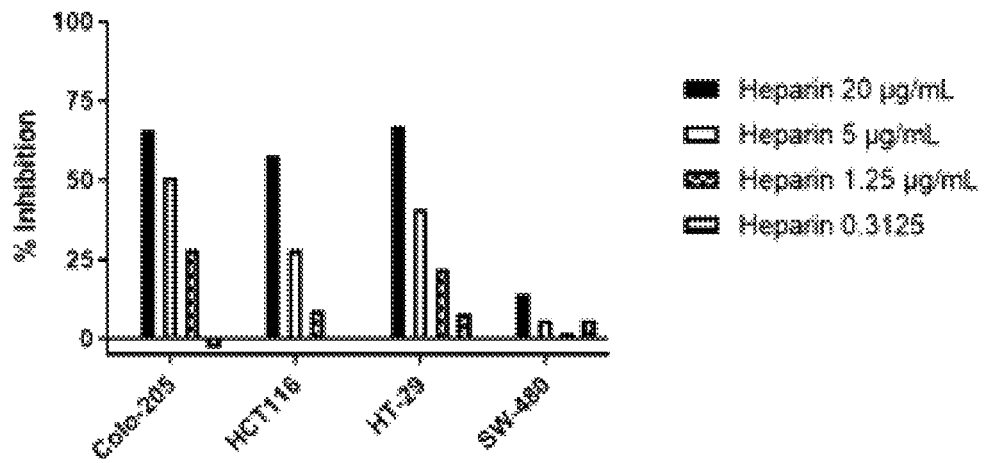
Figure 7A:
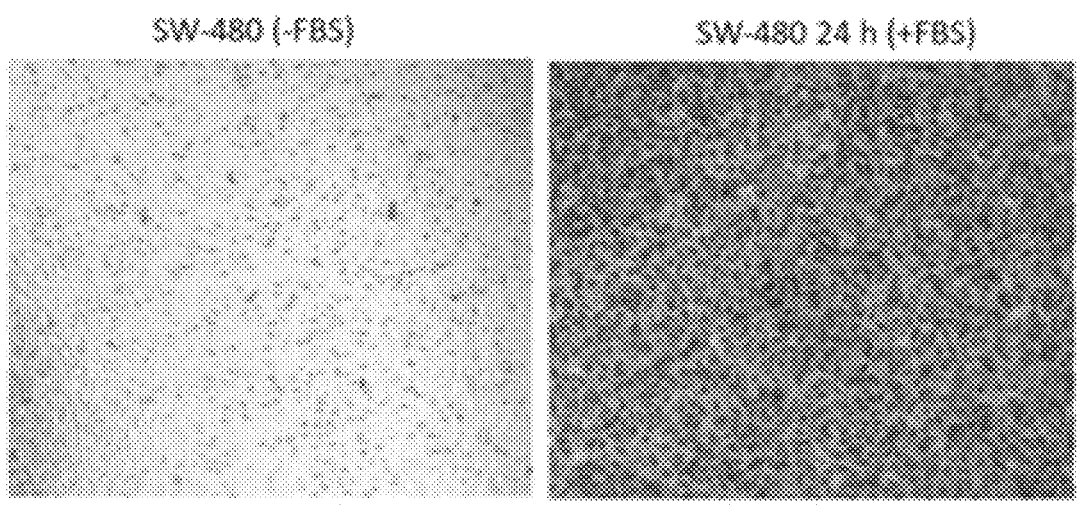
FIGS. 7A and 7B depict results of an assay, migration (B6) of tumor cells, using FBS as chemoattractant and in presence of different doses of Cytochalasin D, according to embodiments as disclosed herein.
Figure 7B:
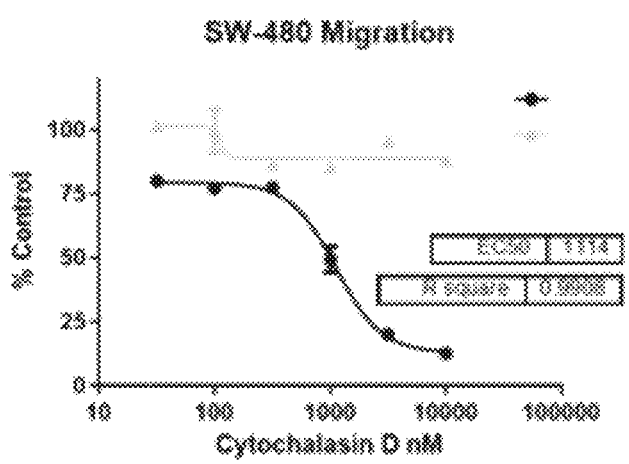
Figure 8A:
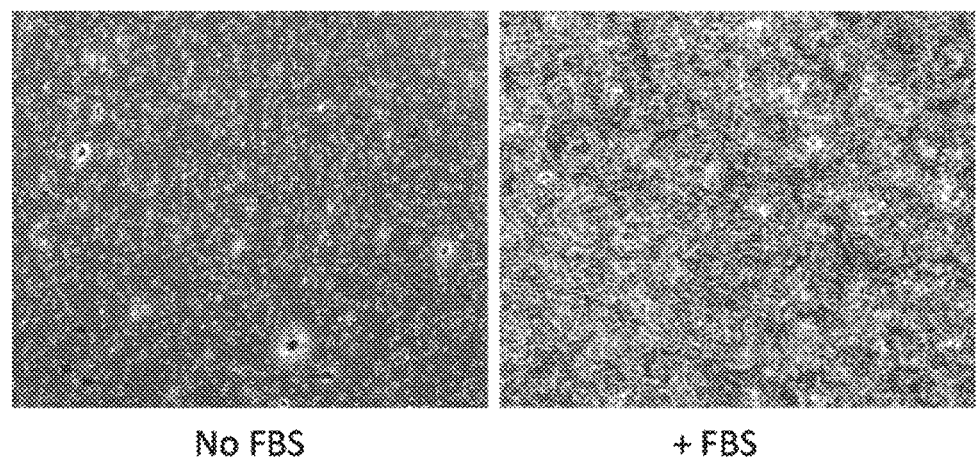
FIGS. 8A, 8B and 8C depict results of an assay, invasion (B7) of tumor cells, using Basement membrane matrix and FBS and in presence of different doses of Paclitaxel, according to embodiments as disclosed herein.
Figure 8B:
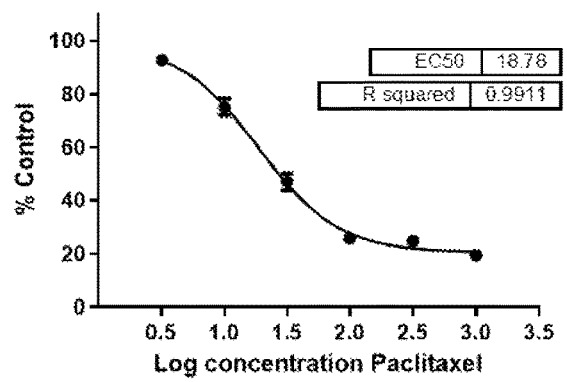
Figure 8C:
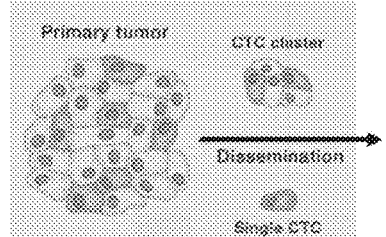
Figure 8C:
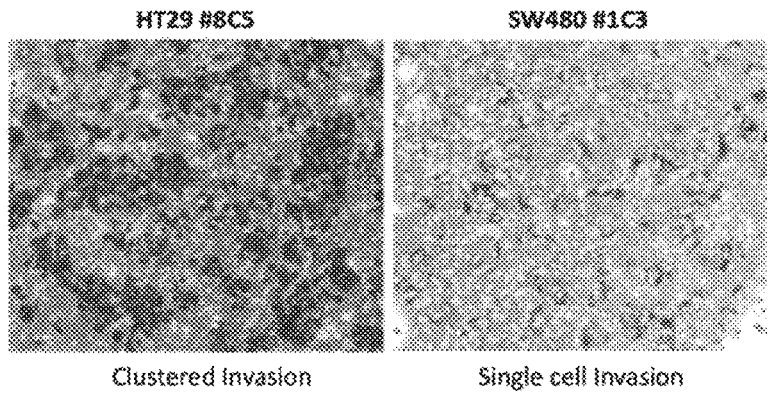
Figure 9A:
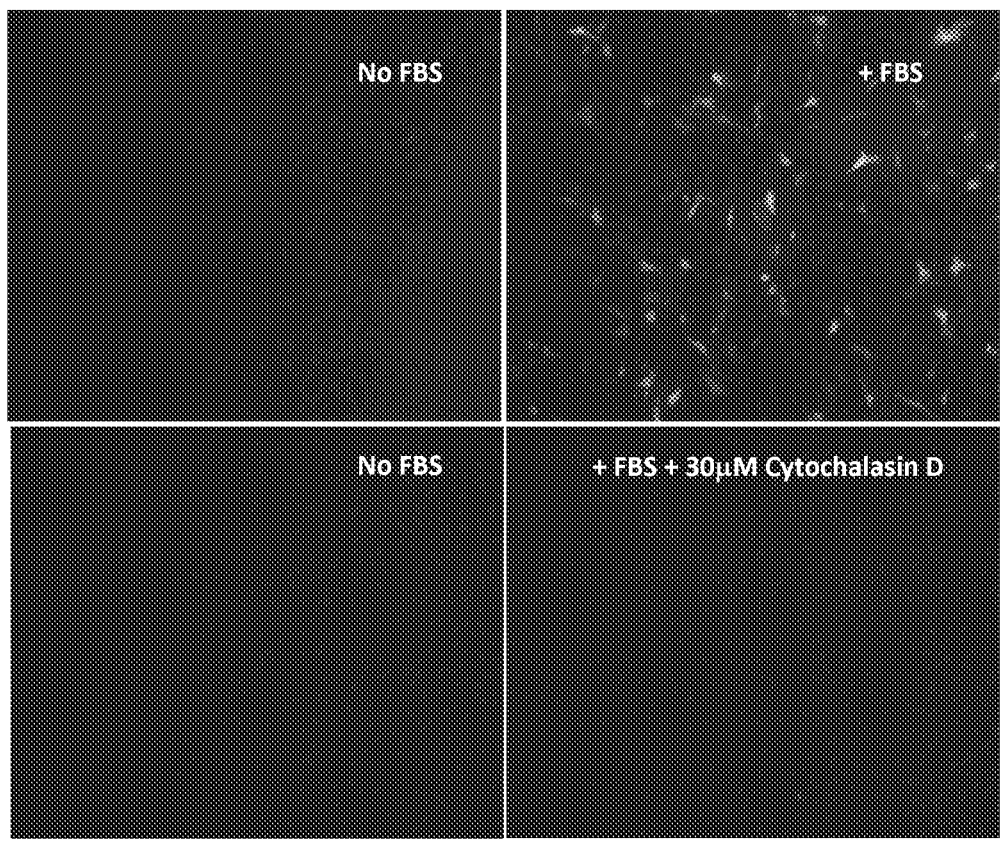
FIGS. 9A, 9B, 9C and 9D depict an assay, intravasation (C8), showing trans-endothelial migration (TEM) images of tumor cells with and without FBS and/or Cytochalasin D; percentage inhibition of TEM; TEM with platelet rich plasma (PRP) and platelet poor plasma; and fold change in intravasation ability of colon cancer cell, respectively, according to embodiments as disclosed herein.
Figure 9B:
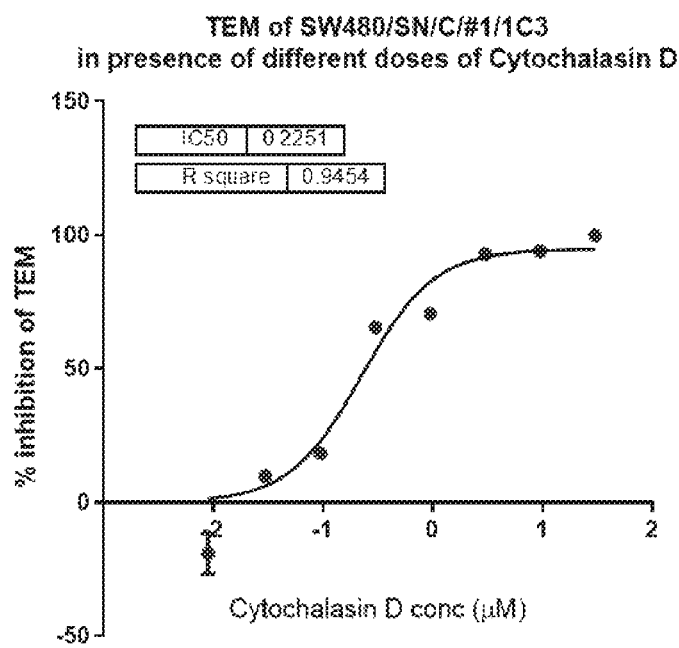
Figure 9C:
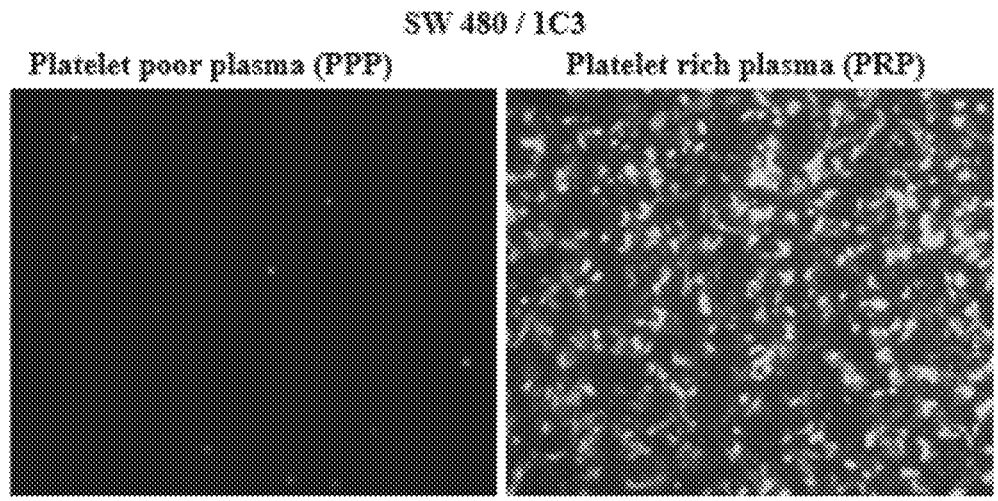
Figure 9D:
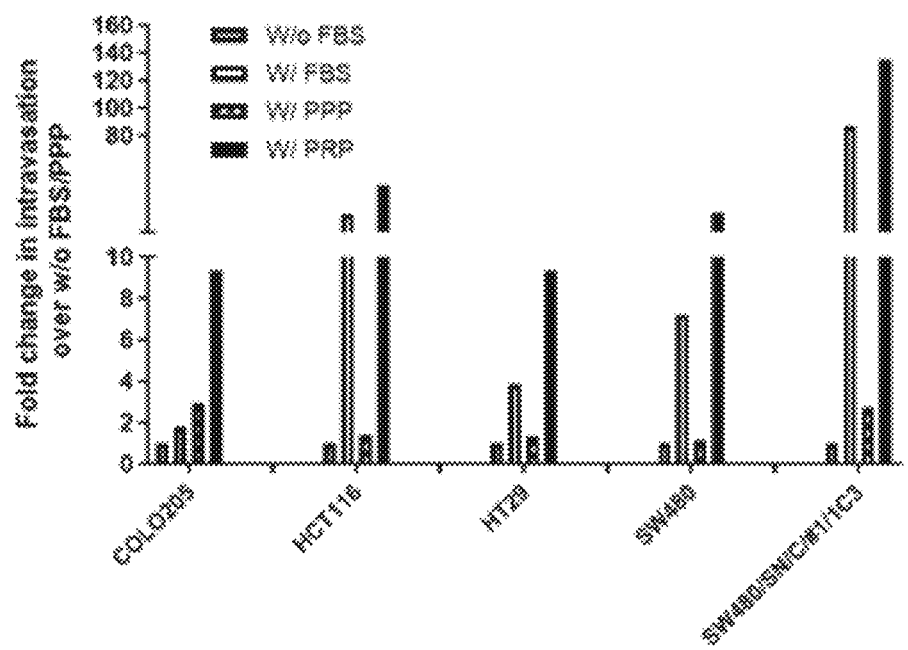

Group B includes evaluating the ability of the cells to move out of epithelial layer. For evaluating the ability of the cells to move out of epithelial layer (group B), the following parameters are evaluated, adhesion (B5) (as depicted in FIGS. 6A and 6B), migration (B6) (as depicted in FIGS. 7A and 7B), and invasion (B7) (as depicted in FIGS. 8A, 8B and 8C).

Adhesion properties of the cells is the ability to dissociate from tumor mass and adhere to the epithelial membrane and is one of the first criteria of metastasis, that is evaluated by measuring the ability of tumor cells to bind to epithelial membranes. This is achieved by using synthetic proteins that mimic epithelial membrane proteins, thereby creating an epithelial like environment. This is important for the initial success of metastasis as without successful anchoring, cells would not be able to penetrate inside and through the epithelial membrane. Basement membrane matrix (major components: laminin, collagen IV, entactin, and heparin sulfate proteoglycan)—Final Concentration 2 ug/ml. Readout: Counting of adhered cells after wash, by measurement of ATP content. FIG. 6A depicts the adhesion percentage of colon cancer cells. FIG. 6B depicts the effect of Heparin on adhesion.

The ability to move towards a chemoattractant is one of the first criteria of metastasis. Migration properties of the cells are evaluated by measuring the ability of tumor cells to move away from the solid tumor towards a chemoattractant signature. Chemoattractants are chemical or biochemical agents that attract an organism or a cell towards itself. They are the reason for cell motility. In tumors, growth factors, cytokines and chemokines and several proteins in the blood act as a chemoattractant, drawing the tumor out from its natural habitat. For measuring the migration property of the cell, the assay uses a two chamber system, divided by a transwell insert, that are laid over a chemoattractant, with the cells being plated on top of the insert. Transwell inserts are permeable tissue culture plate insert (Transwell®, Corning, Inc., Lowell, Mass). Alternatively, any permeable growth support that capable of being inserted into a well of a tissue culture plate may be used. The permeable insert generally provides a means to partition the well into a two or more portions, for e.g.: basolateral portion and apical portion, etc. The results depicted in FIGS. 7A-7B use Transwell Inserts (Polyester membrane, 8 um pore size, 6.5 mm diameter), 24 well plate format, FBS as chemoattractant, and ATP measurement and/or 0.1% crystal violet staining. FIGS. 7A and 7B are representations depicting migration (B6) of tumor cells, using FBS as chemoattractant and in presence of different doses of Cytochalasin D.

The ability to cleave through the epithelial membrane is one of the first criteria of metastasis. Invasion properties of the cells are evaluated by measuring the ability of tumor cells to tear through the epithelial membrane and move towards the chemoattractant. This is a summative characterization of the adhesion and migration, along with the cells ability to penetrate the epithelial membrane. The assay is a mixture of both the migration and adhesion assay, using transwell inserts and artificial epithelial protein membrane. FIGS. 8A, 8B and 8C are representations depicting invasion assay (B7) of tumor cells. The results depicted in FIGS. 8A and 8B use Transwell Inserts (Polyester membrane, 8 um pore size, 6.5 mm diameter), 24 well plate format, FBS as chemoattractant, Basement membrane matrix (major components: laminin, collagen IV, entactin, and heparin sulfate proteoglycan)—Final Concentration 2 ug/ml, 0.1% crystal violet staining (FIG. 8A) and/or ATP measurement (FIG. 8B). Dissemination can be of two types; single cell vs. cluster (as depicted in FIG. 8C).

Figure 10A:
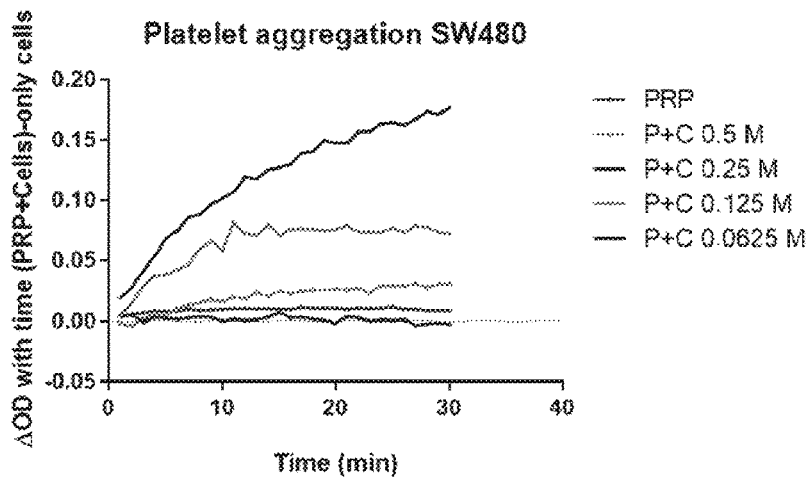
FIGS. 10A, 10B and 10C depict results of an assay, Tumor Cell Induced Platelet Aggregation (TCIPA) (C9), at various concentrations of PRP and cancer cells; with colon cancer cells at 0.25M and 0.5 M concentrations; and with HT 29 wildtype and its clones, viz. 8C5 and 12BC6, according to embodiments as disclosed herein.
Figure 10B:
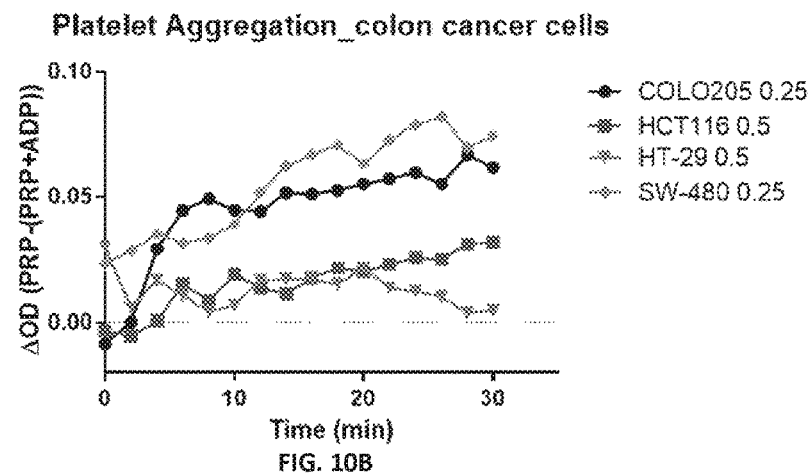
Figure 10C:
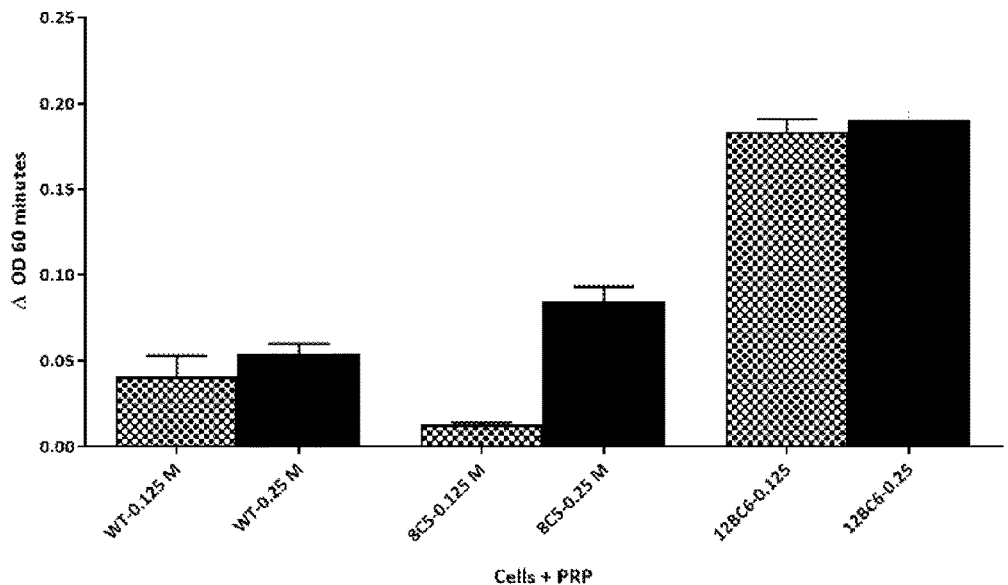
Figure 11A:
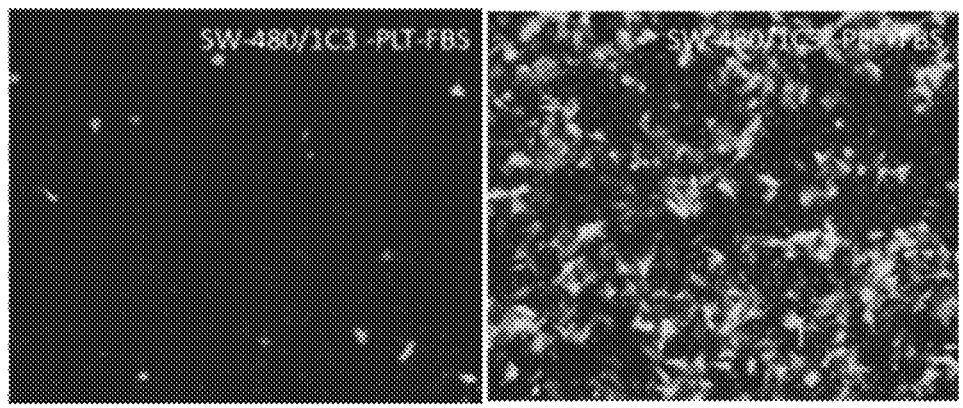
FIGS. 11A and 11B depict an assay, extravasation (C10) in tumor, showing TEM images of tumor cells with and without platelets; and of HT 29 wildtype versus HT 29, 8C5 and 12BC6, respectively, according to embodiments as disclosed herein.
Figure 11B:
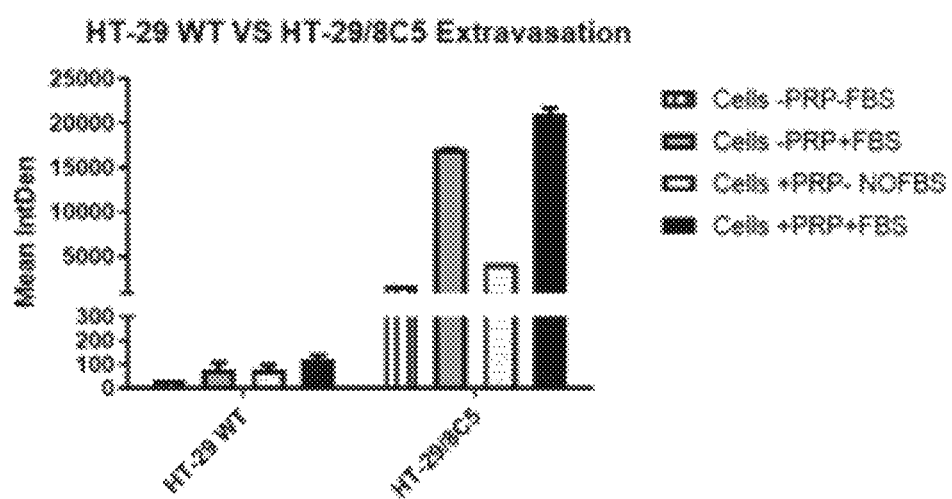

Group C includes evaluating the ability of the cell to enter the endothelial system (blood), survive in the endothelial system and migrate from the endothelial system to a secondary site. For evaluating the ability of the cells to enter the endothelial system (blood), survive in the endothelial system and migrate from the endothelial system into the secondary site (group C), the following parameters are evaluated; intravasation (C8) (as depicted in FIGS. 9A, 9B, 9C and 9D), Tumor Cell Induced Platelet Aggregation (TCIPA) (C9) (as depicted in FIGS. 10A, 10B and 10C), and extravasation (C10) (as depicted in FIGS. 11A and 11B).

FIGS. 9A, 9B, 9C and 9D are representations depicting assay for intravasation (C8), showing TEM images of tumor cells with and without FBS and/or Cytochalasin D; percentage inhibition of TEM; platelet rich plasm (PRP) and platelet poor plasma; and fold change in intravasation ability of colon cancer cell, respectively. FIGS. 10A, 10B and 10C are representations depicting assay for Tumor Cell Induced Platelet Aggregation (TCIPA) (C9), at various concentrations of PRP and cancer cells; with colon cancer cells at 0.25M and 0.5 M concentrations; and with HT 29 wildtype and its clones, viz. 8C5 and 12BC6. FIGS. 11A and 11B are representations depicting extravasation (C10) in tumor, showing TEM images of tumor cells with and without platelets; and of HT 29 wildtype versus HT 29, 8C5 and 12BC6.

Intravasation is defined as the ability of tumor cells to invade through the endothelial layer in the presence of stimuli (i.e., it measures the ability of cells to penetrate through endothelial cell layers (FIGS. 9A and 9B) and the ability to cleave through the endothelial membrane, moving towards enriched blood (FIGS. 9C and 9D)). For measuring the intravasation ability of tumor, monolayer formation of the endothelial layer and its integrity is studied followed by measuring the amount of tumor cells that successfully invade through the endothelial layer. The assay uses both synthetic protein cocktail as a chemoattractant and also whole human blood in an enriched form, to mimic the physiology. Transwell inserts are used with tumor cells, primary endothelial cells being on the top and enriched whole blood or protein cocktail on the bottom. In the experimental results depicted in FIGS. 9A and 9B (which depicts the Trans-endothelial migration), Transwell Inserts, 24 well plate format, FBS or platelet rich plasma (PRP) as chemoattractant, Human umbilical vein endothelial cells (HUVEC), integrity confirmed by FITC-Dextran after 72 h of seeding, and Readout EmGFP engineered cells. In the experimental results depicted in FIGS. 9C and 9D (which depicts the measure of intravasation), Transwell Inserts, 24 well plate format, FBS or PRP as chemoattractant, Human umbilical vein endothelial cells (HUVEC), integrity confirmed by FITC-Dextran after 72 h of seeding, and Readout EmGFP engineered cells.

Surviving in blood is a prerequisite for successful metastasis and is done by binding with platelets. TCIPA is defined as the ability of tumor cells to bind with platelets and subsequently activate them. This not only helps them to evade immune surveillance, but also activated platelets release chemicals that helps cells to extravasate out. Platelet rich plasma (PRP) isolated form healthy volunteers and platelet activation is standardized with ADP. It is measured by measuring the change in the optical density of the tumor cell binding with platelets and subsequent platelet aggregation, using a co-culture of PRP and tumor cells. FIG. 10A depicts platelet aggregation by colon cancer cells. FIG. 10B depicts platelet aggregation with ADP. FIG. 10C depicts platelet aggregation with non-metastatic HT29 wild type and its metastatic clones; 8C5 and 12BC6.

Extravasation is defined as the ability of tumor cells to break out of the endothelial layer to an external tissue. This assay is very similar to the intravasation assay and uses transwell inserts, and enriched whole blood. In this case, the enriched blood and tumor cells are co-incubated together on the transwell insert, coated with a primary endothelial cell monolayer and checked for the integrity of the endothelial layer. FIGS. 11A and 11B are representations depicting assay for extravasation (C10) in tumor, showing TEM images of tumor cells with and without FBS; and of HT 29 wildtype versus HT 29, 8C5 and 12BC6, respectively. In the experimental results depicted in FIGS. 11A and 11B, Transwell Inserts, 24 well plate format, Human umbilical vein endothelial cells (HUVEC), PRP co incubation, and Readout EmGFP engineered cells.

Figure 13:
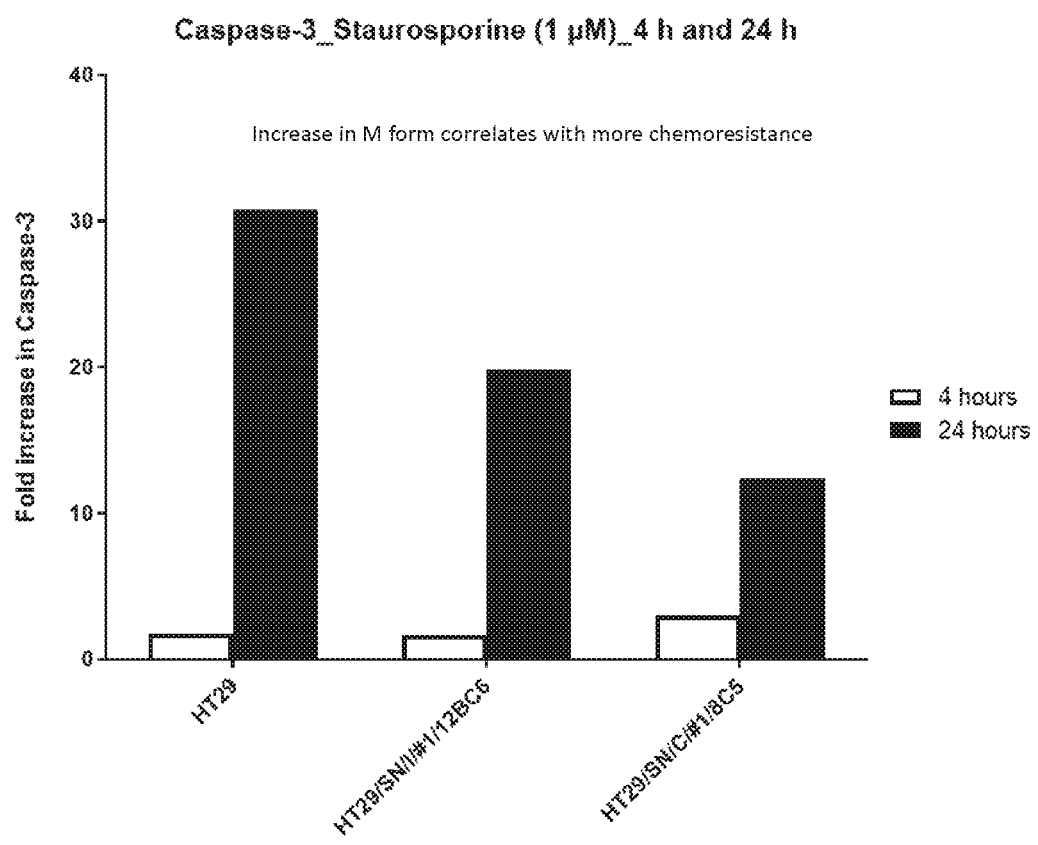
FIG. 13 depict the results of an assay, Apoptosis (D12), showing fold increase in Caspase-3 in HT 29 wildtype, HT 29 clone 8C5 and HT 29 clone 12BC6 cells, according to embodiments as disclosed herein.
Figure 14:
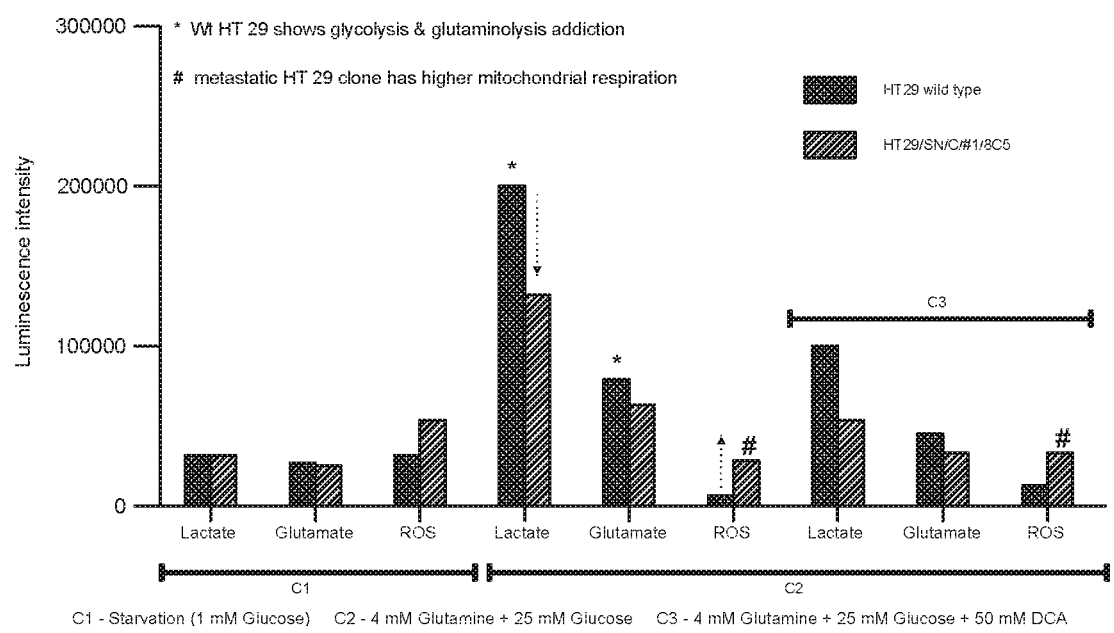
FIG. 14 depict results of an assay, Metabolism (D13), showing 72 hour metabolic profile of HT 29 wildtype, HT 29 clone 8C5 and HT 29 clone 12BC6 cells, according to embodiments as disclosed herein.
Figure 15A:
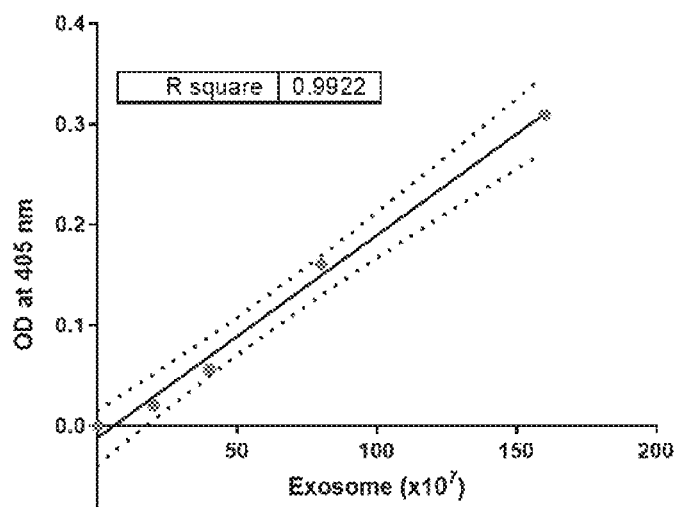
FIGS. 15A, 15B and 15C depict results of an assay, Exosome vesicles secretion and uptake (D14), showing standard curve of exosome quantification; exosome secretion in colon cancer cells; and exosome uptake in cell lines, according to embodiments as disclosed herein.
Figure 15B:
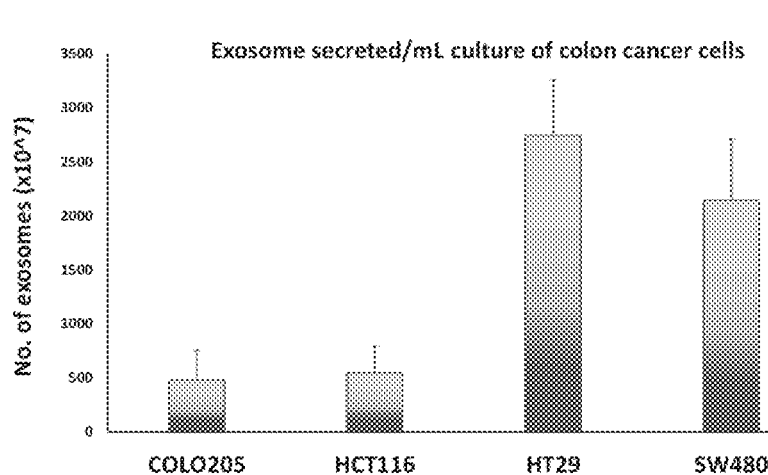
Figure 15C:
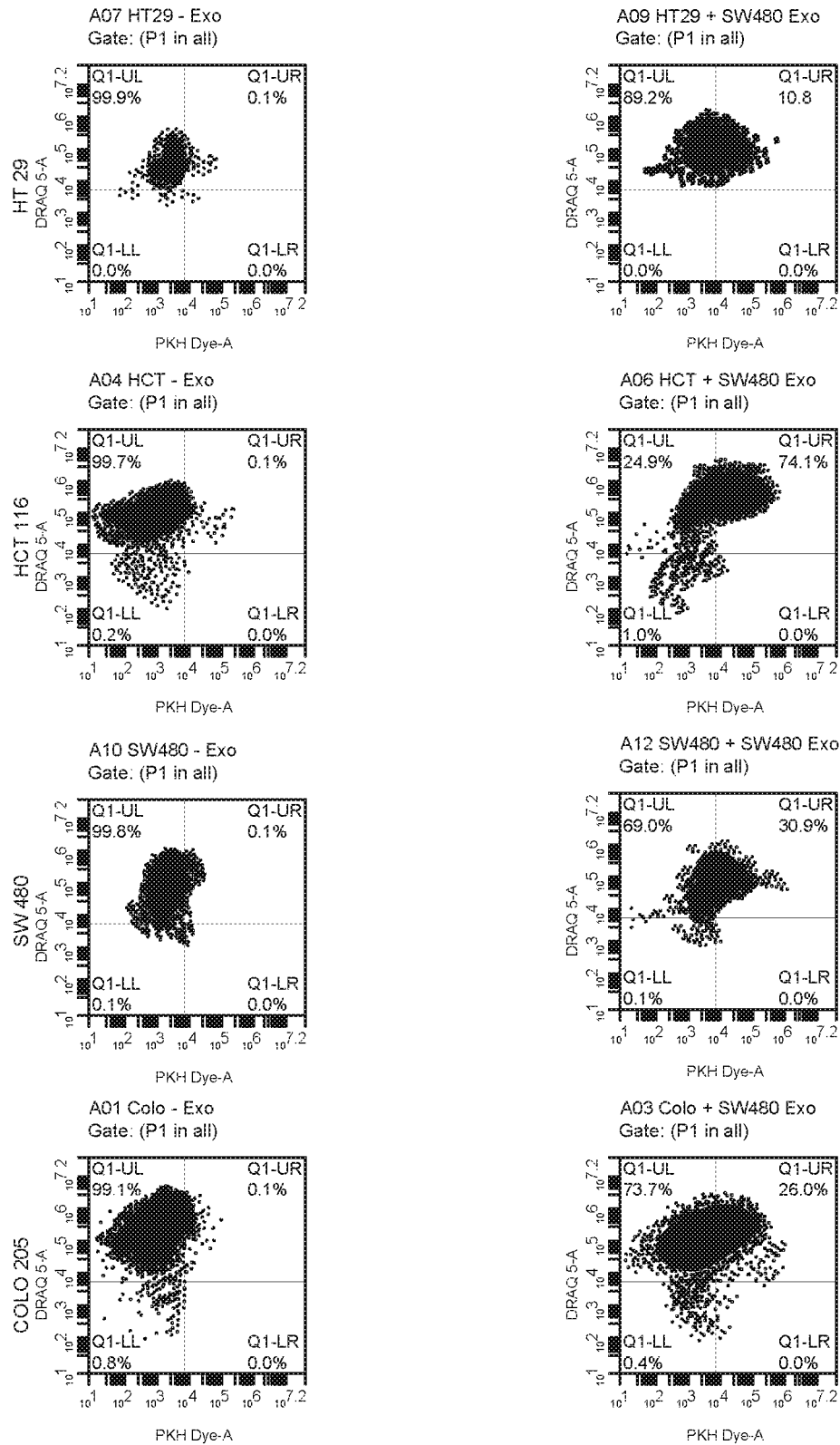

Group D includes evaluating the ability of the cells to survive in the secondary site, cross talk with the tissue in the secondary site and successfully grow back to a tumor in the secondary site. For evaluating the ability of the cells to survive in the secondary site, cross talk with the tissue in the secondary site and successfully grow back to a tumor in the secondary site (group D), the following parameters are evaluated; Mesenchymal to Epithelial transition (MET) (D11) (as depicted in FIGS. 12A and 12B), Apoptosis (D12) (as depicted in FIG. 13), Metabolism (D13) (as depicted in FIG. 14), and Exosome vesicles secretion and uptake (D14) (as depicted in FIGS. 15A, 15B and 15C).

Figure 12A:
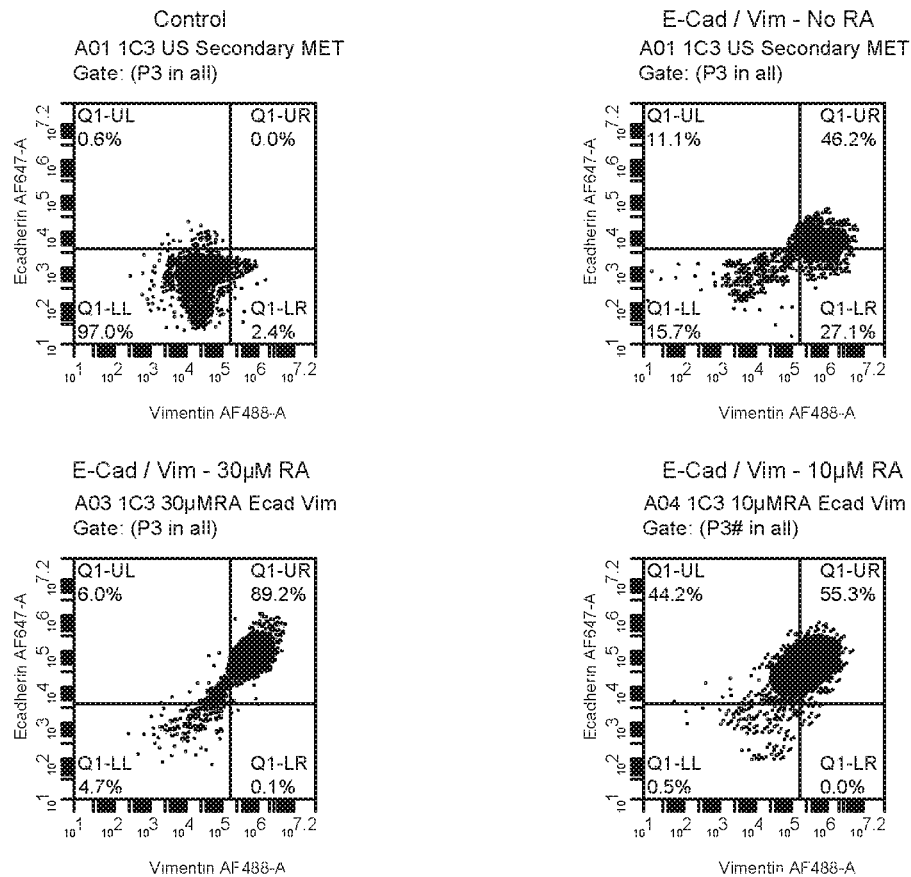
FIGS. 12A and 12B depict an assay, Mesenchymal to Epithelial transition (MET) (D11), at various concentrations of Retinoic acid (RA) assessing markers E-Cadherin and Vimentin; and RA effect on expression of E-Cadherin and Vimentin in SW480 clone 1C3, respectively, according to embodiments as disclosed herein.
Figure 12B:
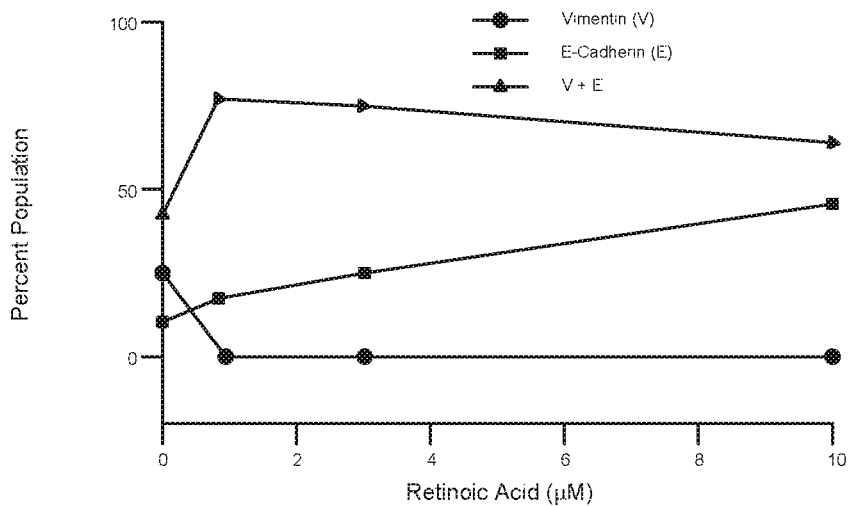

FIGS. 12A and 12B are representations depicting assay for Mesenchymal to Epithelial transition (MET) (D11), at various concentrations of Retinoic acid (RA) measuring markers E-Cadherin and Vimentin; and RA effect on expression of E-Cadherin and Vimentin in SW480 clone 1C3, respectively. FIG. 13 is representations depicting assay for Apoptosis (D12), showing fold increase in Caspase-3 in HT 29 wildtype, HT 29 clone 8C5 and HT 29 clone 12BC6 cells. FIG. 14 is representation depicting assay for Metabolism (D13), showing 72 hour metabolic profile of HT 29 wildtype, HT 29 clone 8C5 and HT 29 clone 12BC6 cells. FIGS. 15A, 15B and 15C are representations depicting assay for Exosome vesicles secretion and uptake (D14), showing standard curve of exosome quantification; exosome secretion in colon cancer cells; and exosome uptake in cell lines.

Mesenchymal to Epithelial transition (MET) is the ability of the tumor cells to change from the moving cellular form, back to the growing cellular form. This is measured by detecting the change in the epithelial and mesenchymal cell markers, once cells are treated with agents promoting MET. Mesenchymal to Epithelial transition is characterized by measuring the PR ratio, where a decrease in PR ratio from 1 or >1 to <1 would decrease invasiveness and stem like properties. Flow cytometry is used, along with imaging techniques like fluorescence markers using multiple proteins as markers, including but not limited to E cadherin, Vimentin, N Cadherin, Epcam, CD 133, CD 44, to measure MET. For the experimental results depicted in FIGS. 12A and 12B, Epithelial marker: E-Cadherin (AF 647), and Mesenchymal marker: Vimentin (AF 488), inducible engineered cell. In FIG. 12A, the PR changes from 1.3 (no RA) to 0.56 (10 mM RA).

Apoptosis tests the ability of the tumor cells to succumb or resist the efforts of the microenvironments to destroy the tumor cells (measurement of caspase 3/7 activity). This is measured by checking the amount of caspase 3 released by cells. FIG. 13 depict the results of an assay, Apoptosis (D12), showing fold increase in Caspase-3 in HT 29 wildtype, HT 29 clone 8C5 and HT 29 clone 12BC6 cells.

The energy metabolism of tumor cells can be studied by measuring the parameters including, but not limited to, lactate consumption, glutamate production, NADH/NADPH and Reactive Oxygen Species (ROS) production. Exploitation of differential metabolism in cells with different PR ratios is disclosed herein. FIG. 14 depict a comparison of aerobic glycolysis versus mitochondrial respiration comparison (with a focus on glycolysis—production of lactate). It depicts a comparison of aerobic glycolysis versus mitochondrial respiration comparison (with a focus on glutaminolysis—production of glutamate). It further depicts a comparison of aerobic glycolysis versus mitochondrial respiration comparison (with a focus on mitochondrial respiration—ROS). It helps in understanding the metabolic profile of epithelial and mesenchymal cells.

Exosome vesicles secretion and uptake measures the ability of the tumor cells to grow in a foreign secondary environment. This is the direct result of the ability of the tumor cells to secrete and absorb exosome vesicles that allows it to cross talk with the microenvironment. Exosomes are isolated and quantitated from cell cultures, of both moving and growing cells, and from genetically modified cells. FIG. 15A depicts a standard curve of exosome quantification. FIG. 15B depicts an exosome secreted/mL culture of colon cancer cells. The isolated and quantitated exosomes are labeled. The labeled exosomes are then used to evaluate uptake of exosomes in the cells. Survival of tumor cells in secondary tissue depends on successful cross talk, carried out by uptake of exosomes. Embodiments herein label cells, isolate exosomes, purify and quantify the exosomes. Embodiments herein incubate the cell of choice with labeled exosomes and analyze by flow cytometry with DNA counterstaining.

Figure 17:
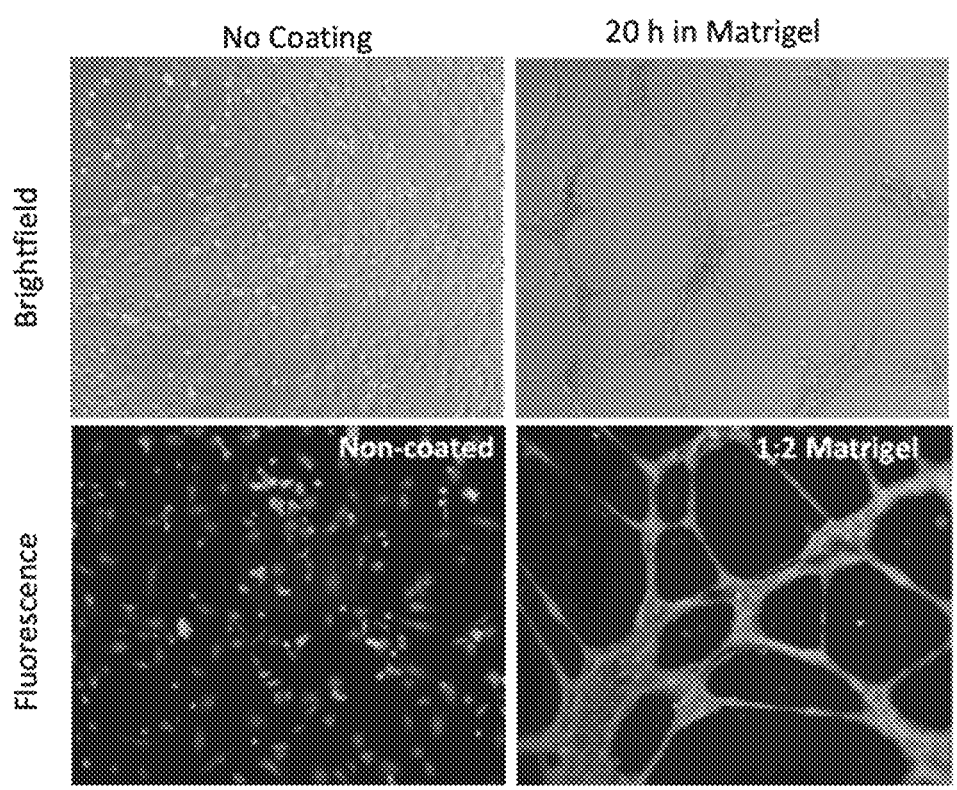
FIG. 17 depicts an assay, Angiogenesis (E16), showing the formation of HUVEC cell mediated tubes, according to embodiments as disclosed herein.
Figure 18A:
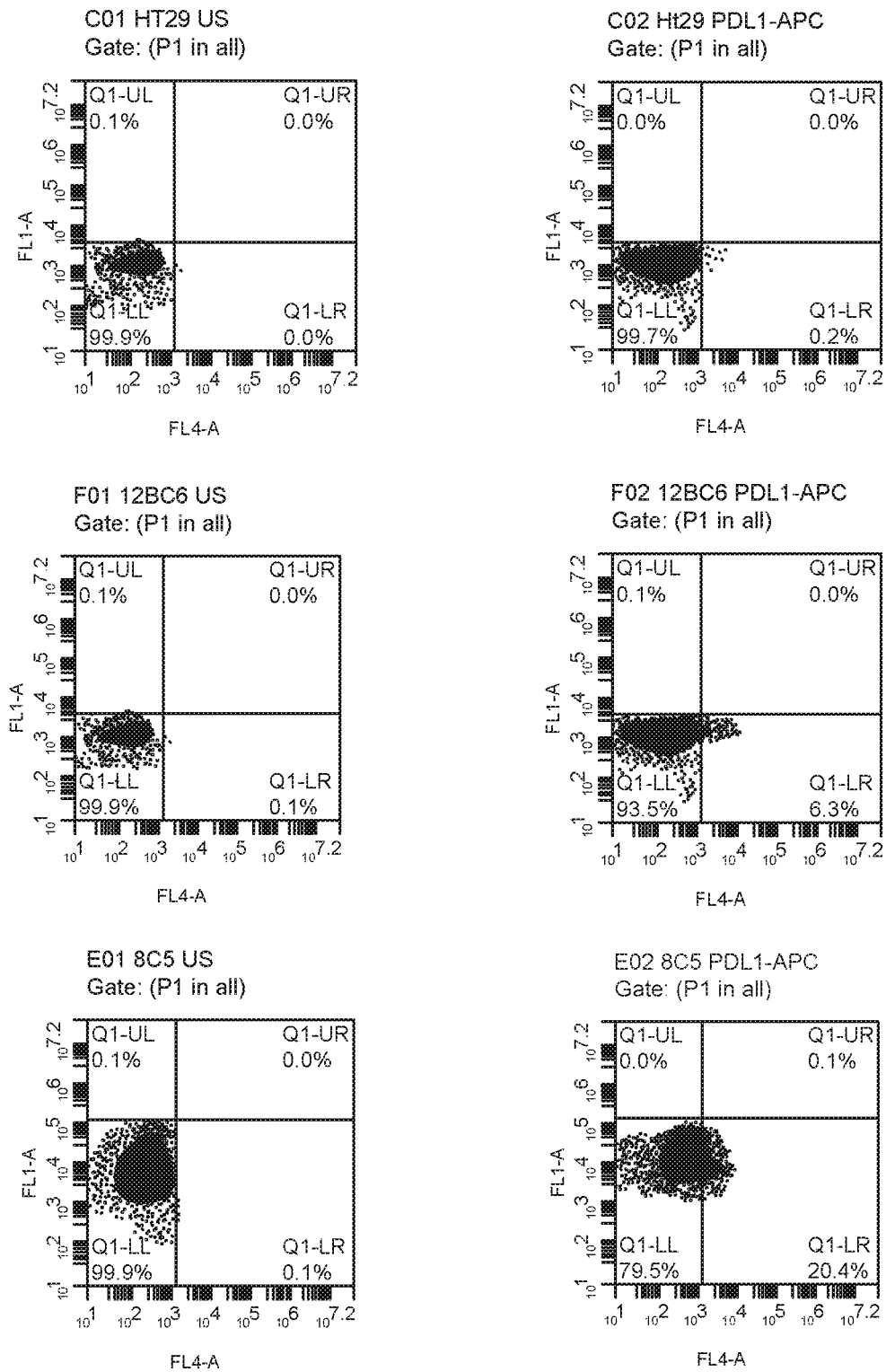
FIGS. 18A, 18B and 18C depict an assay, immune profiling (E17), showing PD-L1 across epithelial and mesenchymal forms (percent population change) of cell lines and primary tumor; % expression in HT 29 wildtype, engineered HT29 #12BC6, and engineered HT29#8C5; and CD-73 across epithelial and mesenchymal forms (percent population change) of cell lines and primary tumor cells, respectively, according to embodiments as disclosed herein.
Figure 18:
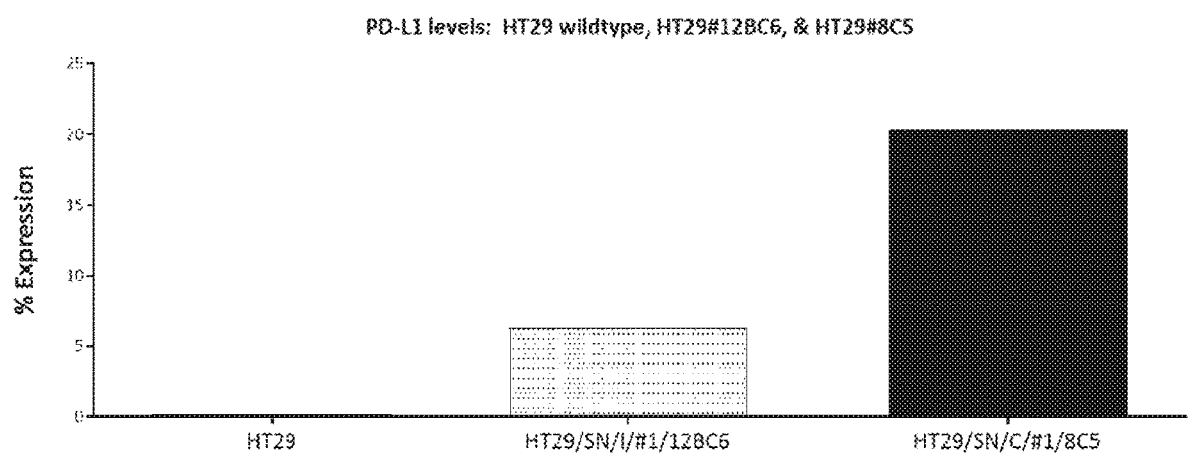
Figure 18C:
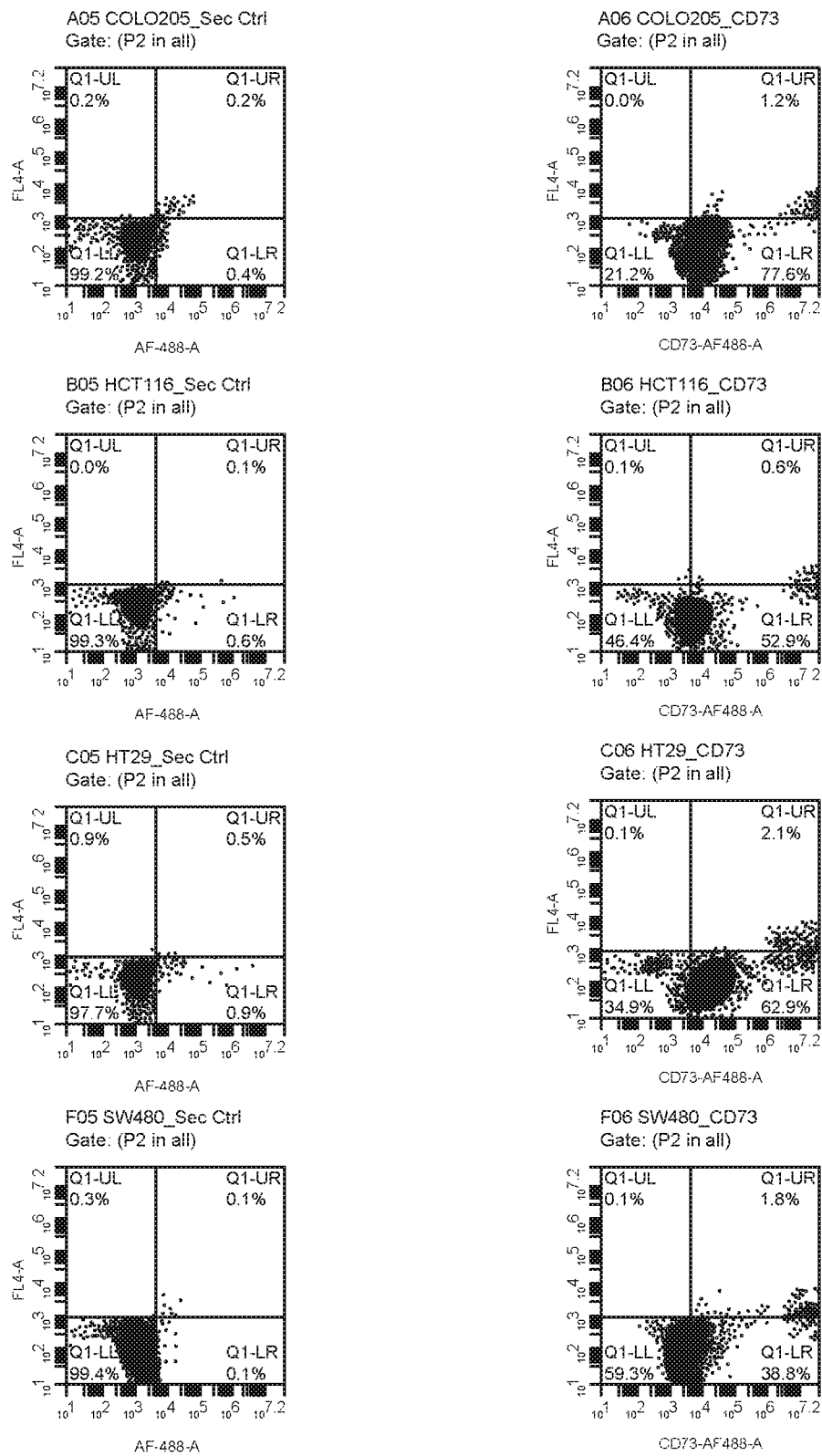
Figure 19A:
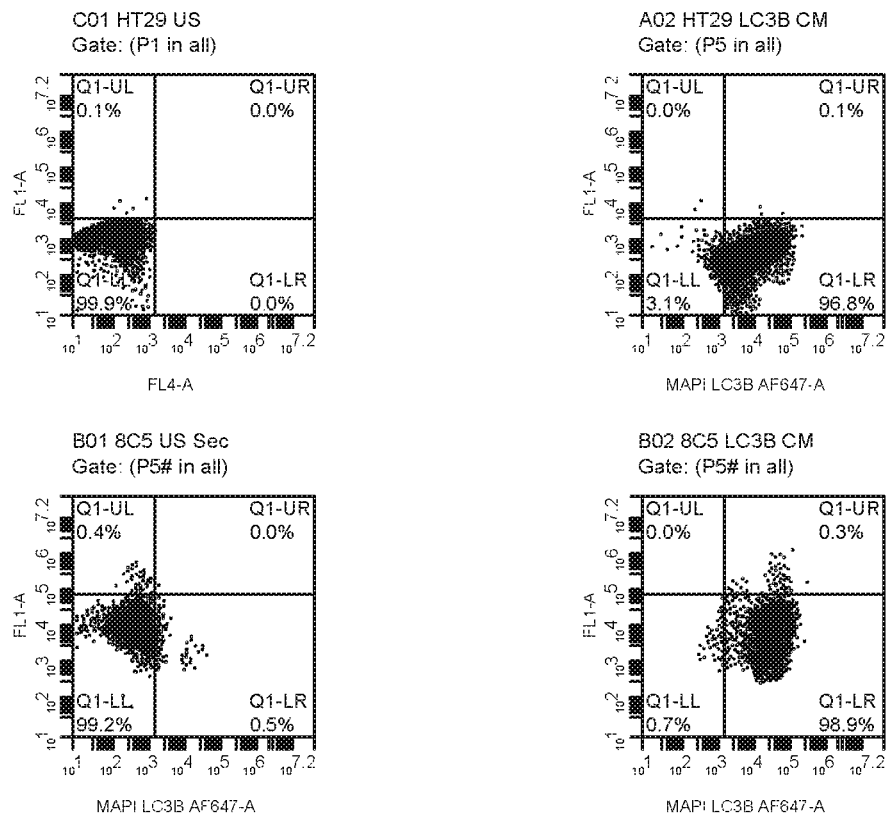
FIGS. 19A and 19B depict results of an assay, autophagy analysis (E18), showing survival of dormant cells in a nutrient deficient environment, according to embodiments as disclosed herein.
Figure 19B:
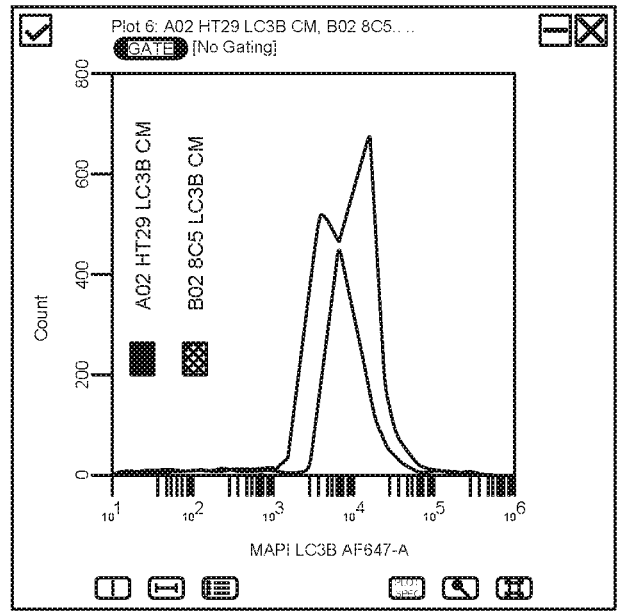
Figure 20A:
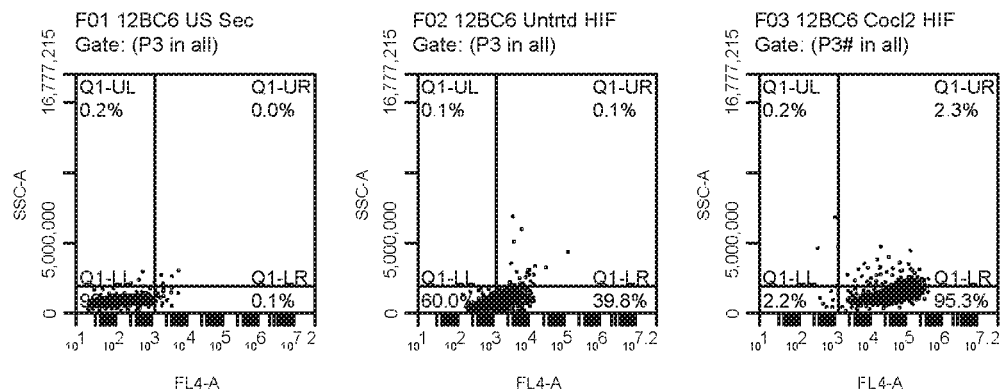
FIGS. 20A and 20B depict an assay, effect of hypoxia, by incubation with Cobalt chloride and percentage of HIF-1alpha positive cells in colon cancer cells, according to embodiments as disclosed herein.
Figure 20B:
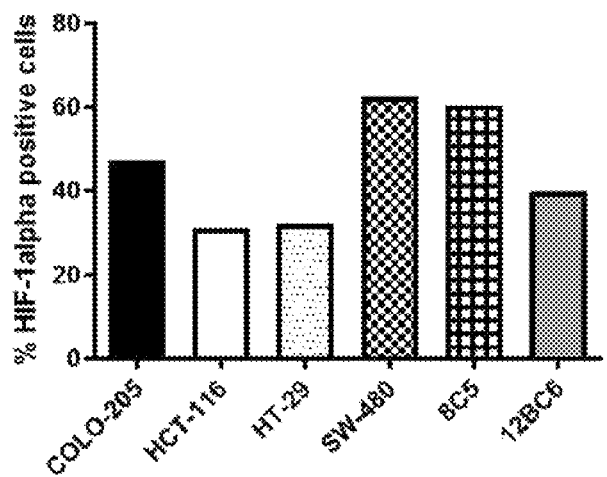
Figure 21A:
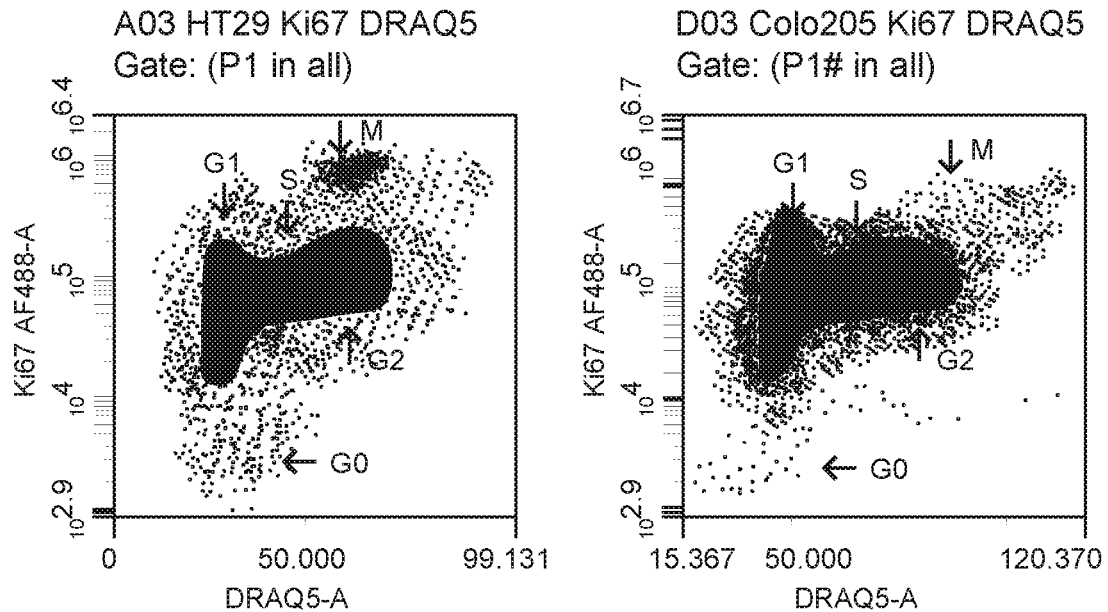
FIGS. 21A, 21B and 21C depict an assay, cell cycle analysis by Ki67 (E20), according to embodiments as disclosed herein.
Figure 21B:
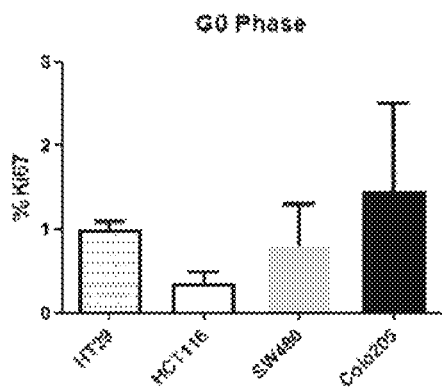
Figure 21C:
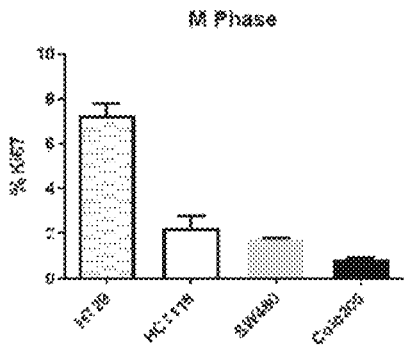

Group E are extrinsic assays. These assays include analysis of certain typical characteristics of the tumor cells that define their ability to survive in a hostile environment, e.g., response to oxidative stress (hypoxia), response to starvation, response to host immune microenvironment, and so on. For group E, the following parameters are evaluated, cytotoxicity (E15) (as depicted in FIG. 16), Angiogenesis (E16) (as depicted in FIG. 17), immune profiling (E17) (as depicted in FIGS. 18A, 18B and 18C), autophagy analysis (E18) (as depicted in FIGS. 19A and 19B), effect of hypoxia (E19) (as depicted in FIGS. 20A and 20B), and cell cycle analysis by Ki67 (E20) (as depicted in FIGS. 21A, 21B and 21C).

Figure 16:
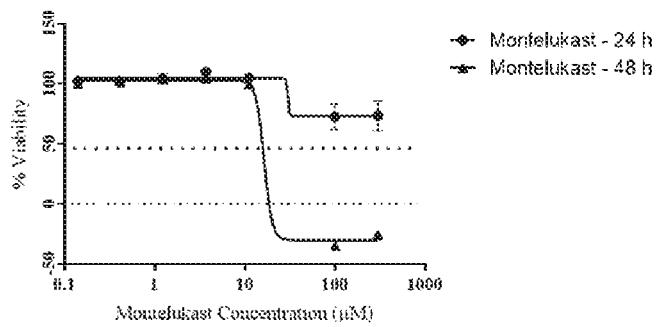
FIG. 16 depict results of an assay, cytotoxicity (E15) in tumor, by LDH release in cell lines treated with Montelukast, Metformin, and Propanol, according to embodiments as disclosed herein.
Figure 16:
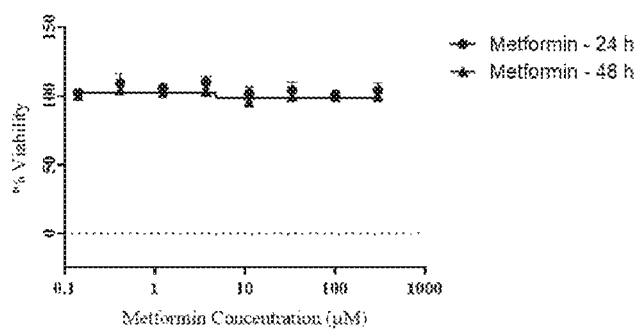
Figure 16:
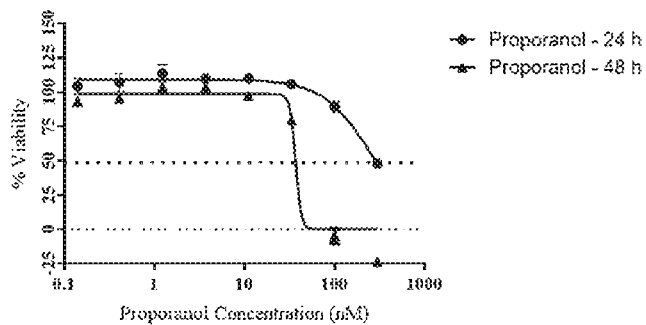

FIG. 16 is a representation depicting assay for cytotoxicity (E15) in tumor, by LDH release in cell lines treated with Montelukast, Metformin, and Propanol. FIG. 17 is a representation depicting assay for Angiogenesis (E16), showing the formation of HUVEC cell mediated tubes. FIGS. 18A, 18B and 18C are representations depicting results of immune profiling (E17), showing PD-L1 across epithelial and mesenchymal forms (Percent population change) of cell lines and primary tumor; and CD-73 across epithelial and mesenchymal forms (percent population change) of cell lines and primary tumor cells. FIGS. 19A and 19B is a representation depicting autophagy analysis (E18), showing survival of dormant cells in a nutrient deficient environment. FIGS. 20A and 20B are representations depicting assay for effect of hypoxia, by incubation with cobalt chloride and percentage of HIF-1alpha positive cells in colon cancer cells. FIGS. 21A, 21B and 21C are representations depicting assay for cell cycle analysis by Ki67 (E20).

Cytotoxicity (E15) detect low level/early cellular damage by measuring LDH activity (as depicted in FIG. 16)

Angiogenesis (E16) is used to test the ability of compounds to inhibit angiogenesis, which is a key step for secondary tumor formation, after MET. FIG. 17 depicts the formation of HUVEC cell mediated tubes.

Immune profiling (E17) comprises of measuring PD-L1 across epithelial and mesenchymal forms (Percent population change) of cell lines and primary tumor cells (as depicted in FIG. 18A) and measuring CD-73 across epithelial and mesenchymal forms (percent population change) of cell lines and primary tumor cells (as depicted in FIG. 18B).

Autophagy analysis (E18) comprises of determining how dormant cells survive in a nutrient deficient environment, till the soil becomes conducive. Autophagy can be measured using flow cytometry.

E 19 comprises of understanding the effect of hypoxia on different cell types, by induction with cobalt chloride and measured using flow cytometry.

Cell cycle analysis (E20) comprises of understanding the effect of PR on cell cycles using Ki67. Cells accumulate in G0 and decrease in M with an increase in PR. This can eventually be directly correlated with cancer stemness properties and can also act as a marker for dormancy.

Each of the above assays, A1 to E20 are carried out with the wild type cancer cell line. The wild type cancer cell line is characteristic of a growing type of a cancer cell. A set of second input data set is generated by conducting the assays A1 to E20 in the genetically altered form of the same cancer cells lines. The genetically engineered cancer cell line is characteristics of a moving type of a cancer cell. The wild type cancer cell line and the genetically engineered cancer cells lines of the present disclosure are selected from, including but not limited to, epithelial carcinoma of head and neck cancers, oesophageal cancer, skin cancer, lung cancer, triple negative breast cancer, gastric cancer, pancreatic cancer, colorectal cancer, liver cancer, bladder cancer, kidney cancer, ovarian cancer, cervical cancer, endometrial cancer, vulvar cancer, uterine cancer, thyroid cancer, and so on. Conducting the assays A1 to E20 for the wild type cancer cell line and genetically engineered cancer cell lines, independently, helps in analyzing the key differences of cellular characteristics, and functional readouts of the wild type cancer cell line (growing cell type) and the engineered cancer cell lines (moving cell type).

The assays are evaluated in at least one of a two-dimensional (2D) or a three dimensional (3D) space. In an embodiment herein, a 2D assay can be converted to a 3D assay using at least one suitable 3D model, with some examples given below.

Figure 22A:
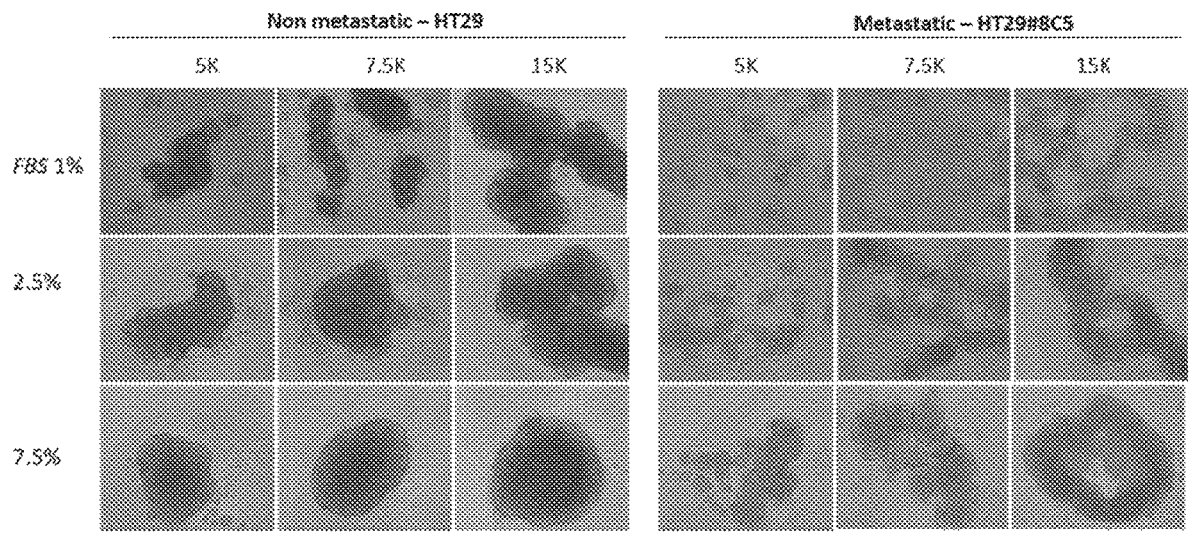
FIG. 22A shows spontaneous spheroid formation in a gradient of fetal bovine serum (FBS) and using different number of cell density for wild type HT29 and engineered HT29#8C5.
Figure 22B:
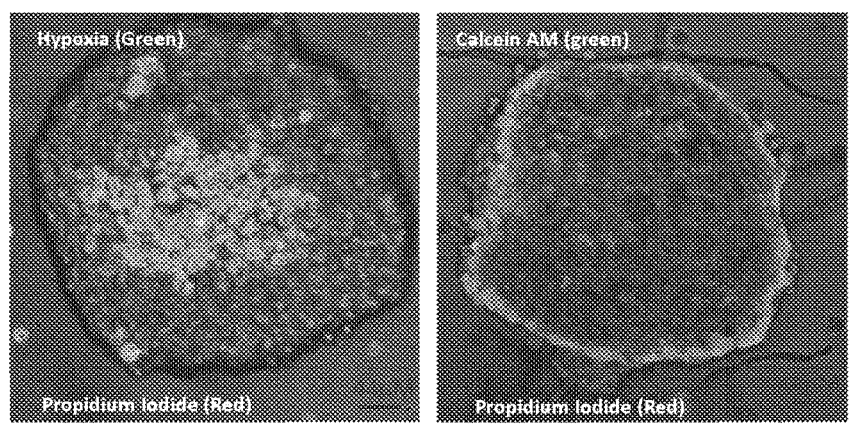
FIG. 22B is a confocal microscopy characterization of spheroid showing the inner necrotic and hypoxic core, along with the peripheral live cells.

FIG. 22A shows spontaneous spheroid formation in a gradient of fetal bovine serum (FBS) and using different number of cell density for wild type HT29 and engineered HT29#8C5. FIG. 22B is a confocal microscopy characterization of spheroid showing the inner necrotic and hypoxic core, along with the peripheral live cells.

Figure 23A:
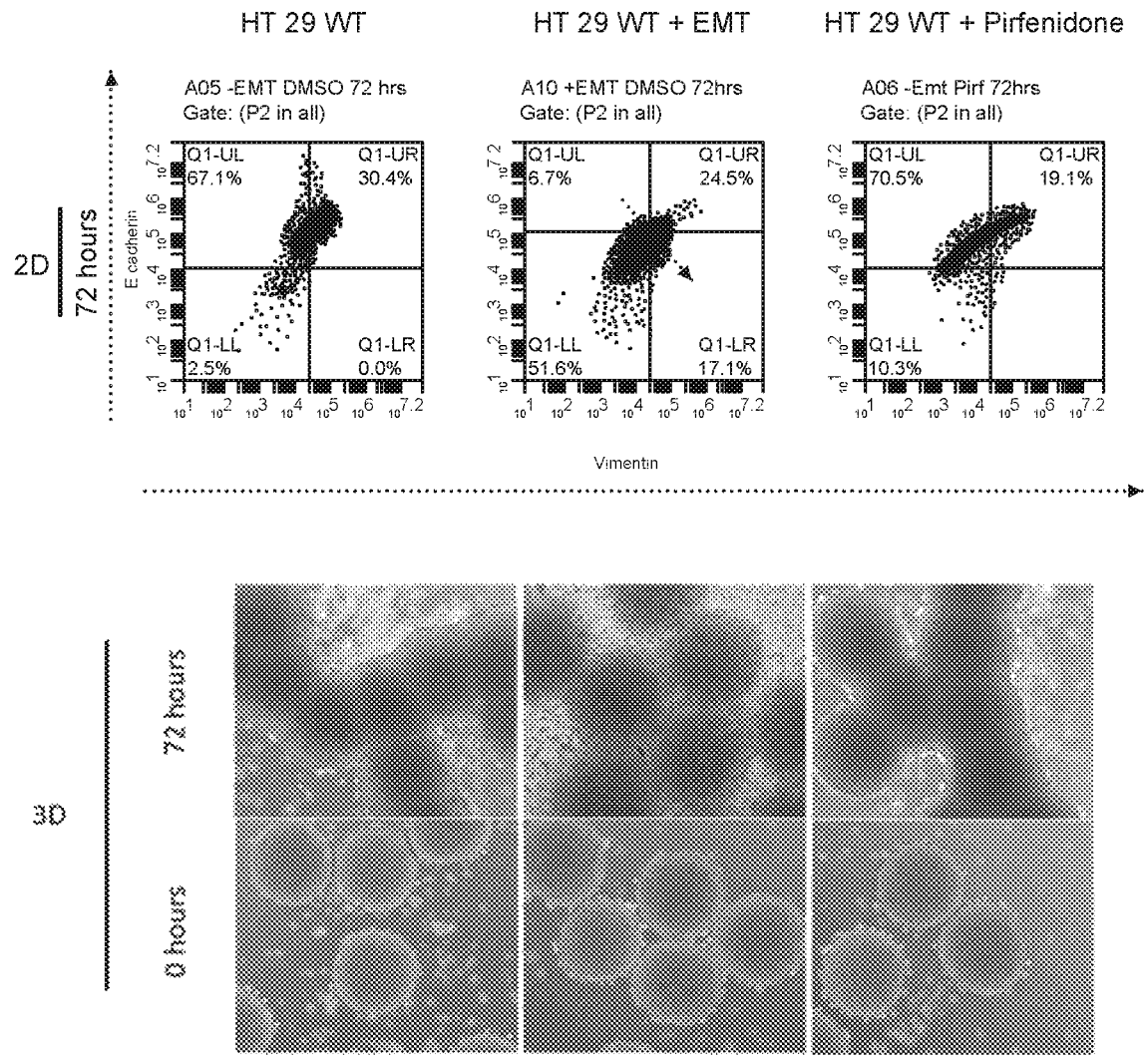
FIG. 23A is a representation of EMT assay in the 3D form.
Figure 23B:
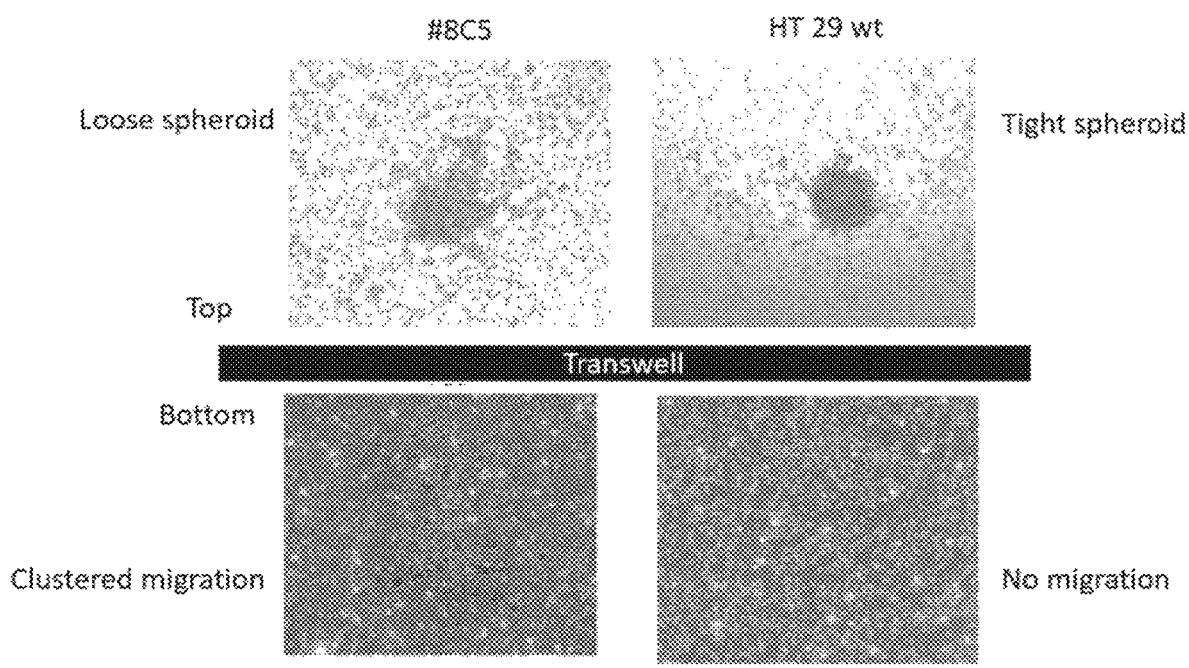
FIG. 23B is a representation of invasion assay in the 3D form.

FIG. 23A is a representation of EMT assay in the 3D form and FIG. 23B is a representation of invasion assay in the 3D form.

In step 102, the conducted cell-based assays are used to obtain data sets. Each of the above assays, A1 to E20 is carried out with the wild type cancer cell line, which provides a first input data set. The assays, wild type cancer cell line and the genetically engineered cell line are used to generate the first input data set and a second input data set. The first and second data sets constitute initial data sets. The data sets comprise data corresponding to the parameters/assays A1 to E20 for each of the cell lines, thereby creating two baselines, one for growing cells and the other for moving cells.

A patient data set is further generated by conducting the assays A1 to E20 on patient derived tumor cells or tumor tissue samples. For this, tissue from cancer patients is collected as per Standard Operating Procedures (SOP), minimizing the ischemia time into standardized buffer, transported to laboratory in cold boxes. A section or small tissue is then submitted for H&E (hematoxylin and eosin) processing and the rest of the tumor is treated to isolate a single cell population as per SOP. This gives P0 of the patient tumor, which is then sub-cultured till P4 or P5, and cells from these sub-cultures are used in the assay platform A1 to E20 to generate a patient dataset, which comprises data corresponding to the parameters A1 to E20.

Figure 24A:
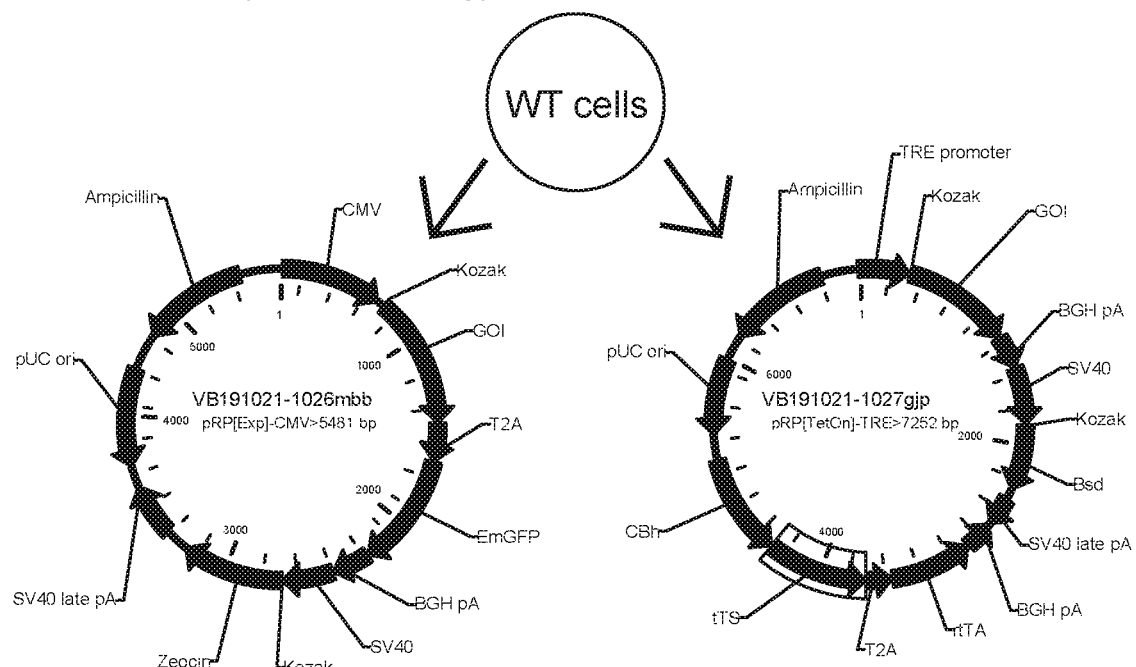
FIG. 24A is a representation depicting overexpression strategy to convert non-metastatic (non-met) cells to metastatic (met) cell, showing vectors construction for genetically engineered cell lines, to increase PR and metastatic properties, the cell lines were engineered by both constitutive and inducible transfection.
Figure 24B:
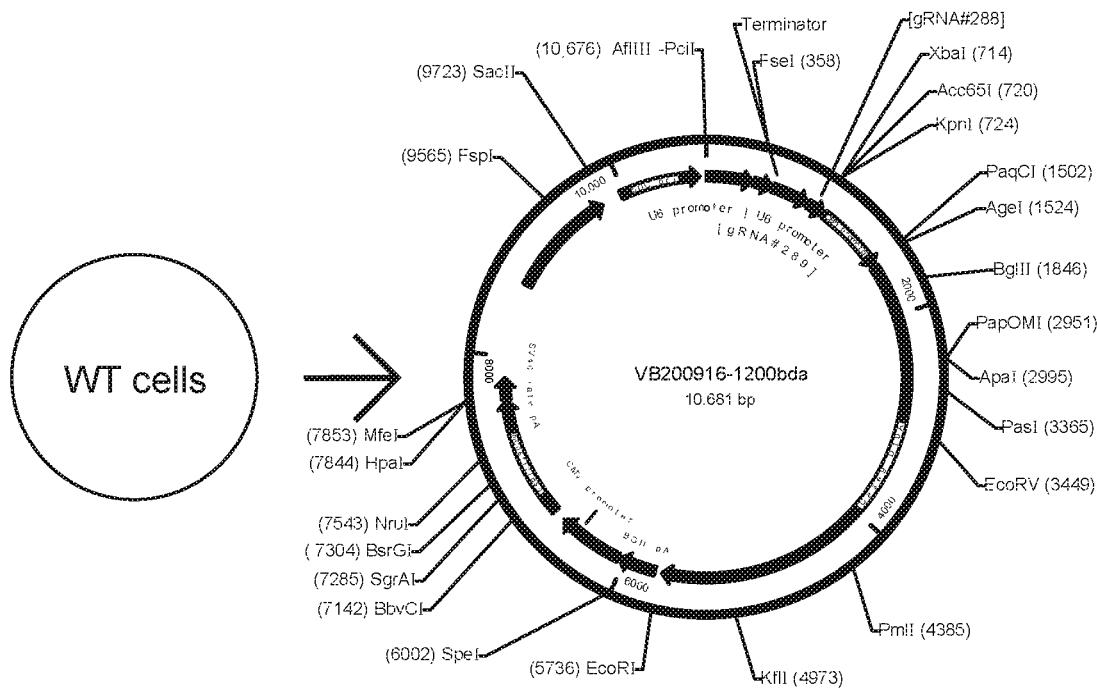
FIG. 24B is a representation of CRISPR CAS9 based strategy to convert met-cells into non-met cells.
Figure 25A:
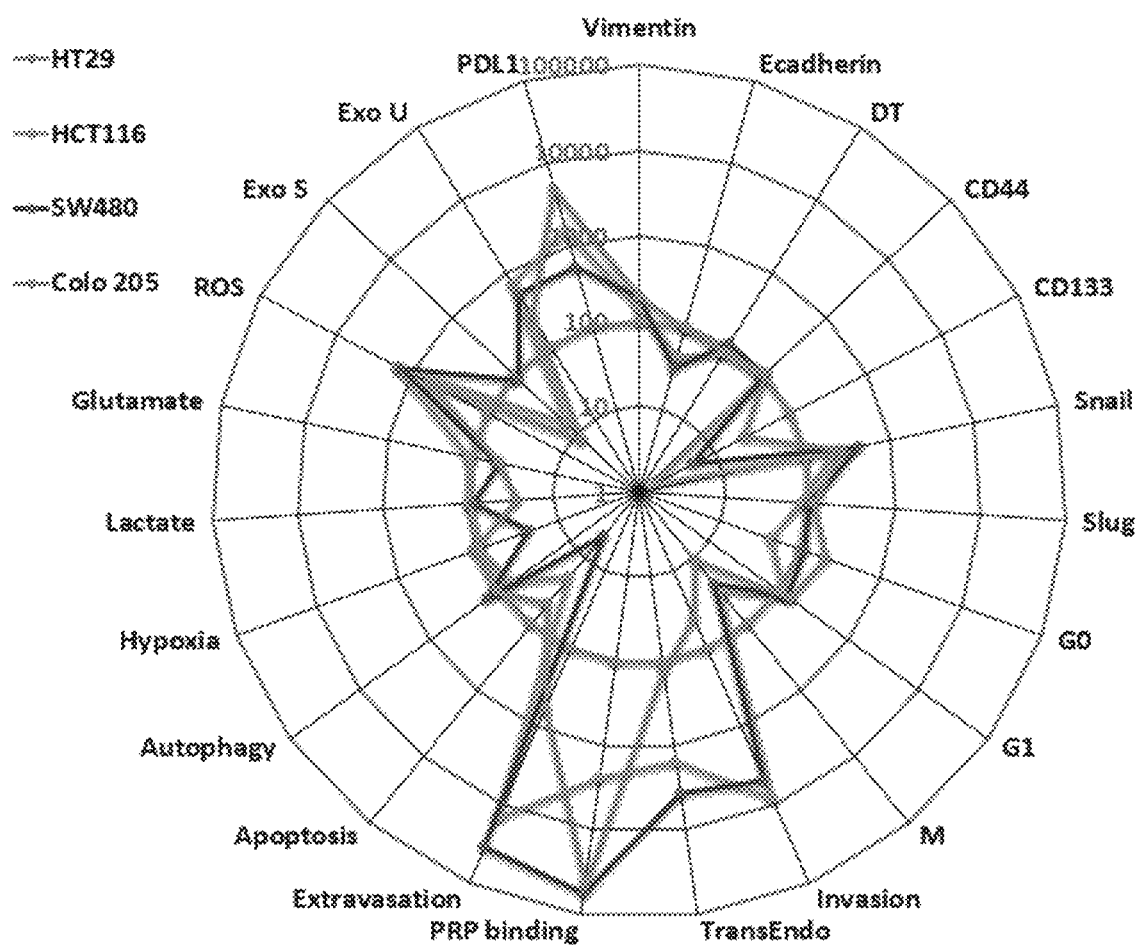
FIG. 25A is a radial chart representation depicting values and correlation of parameter of the assays for wild type cell lines, viz. HT 29, HCT 116, SW480 and COLO 205.
Figure 25B:
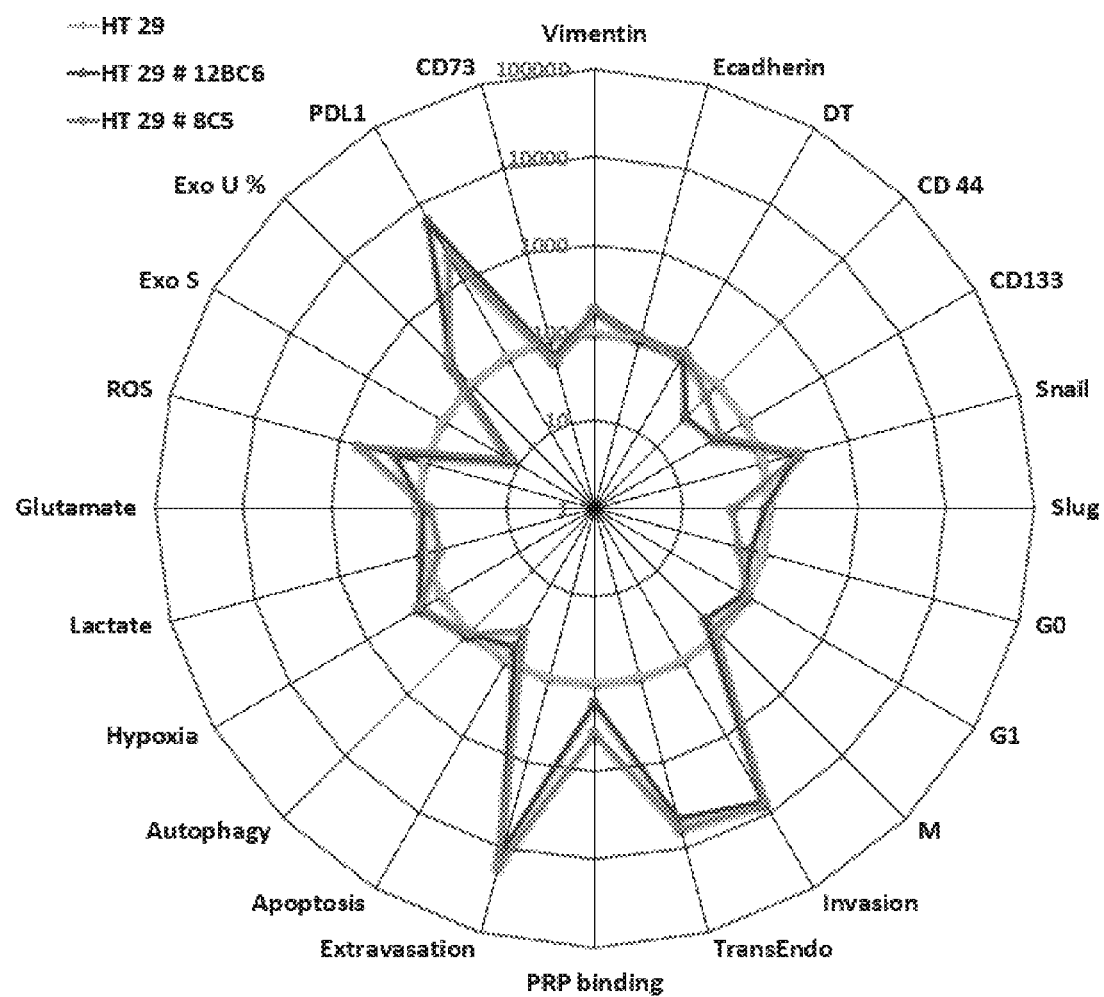
FIG. 25B is a radial representation depicting values and correlation of parameter of the assays for engineered constitutive and inducible clones of HT29.
Figure 26A:
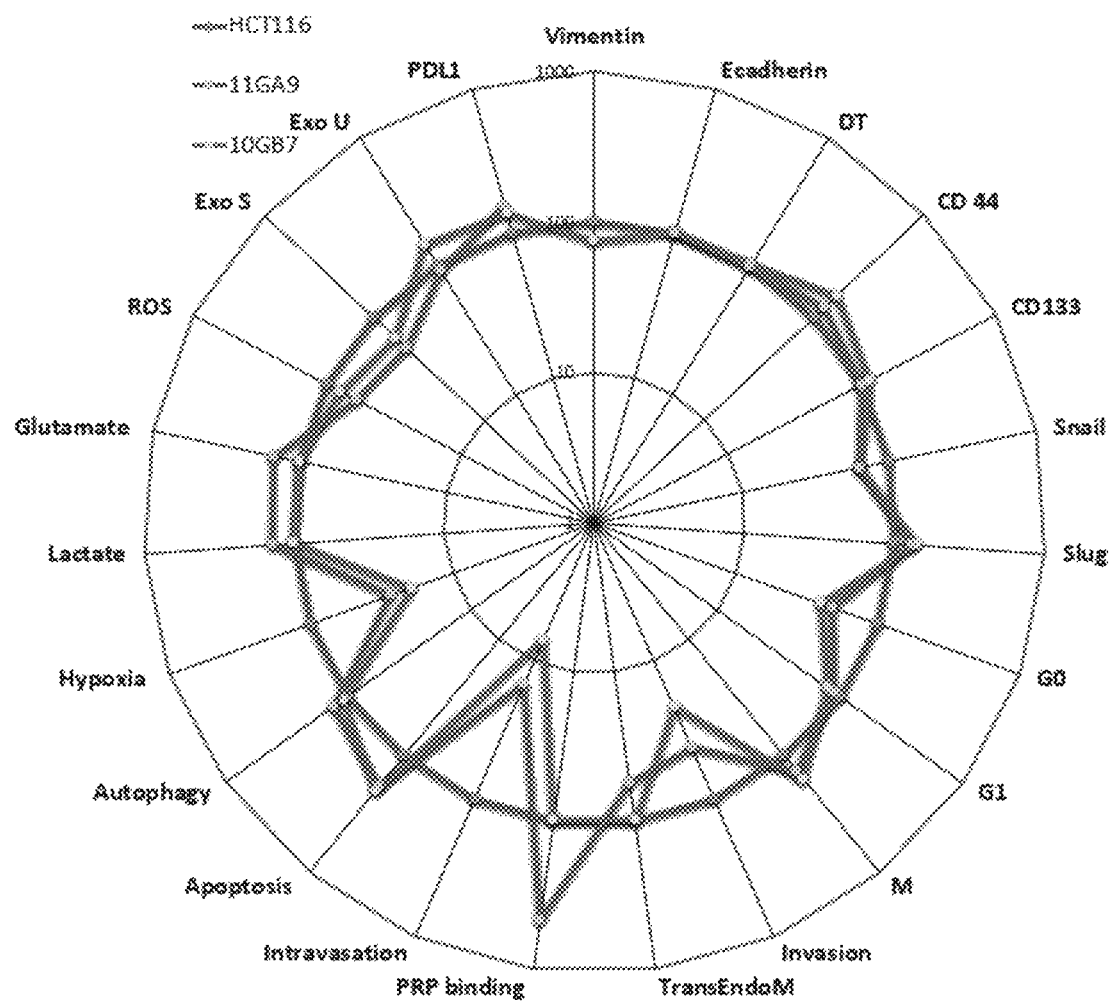
FIG. 26A is a radial chart representation depicting values and correlation of parameter of the assays for engineered (by CRISPR CAS9) cell lines.
Figure 26B:
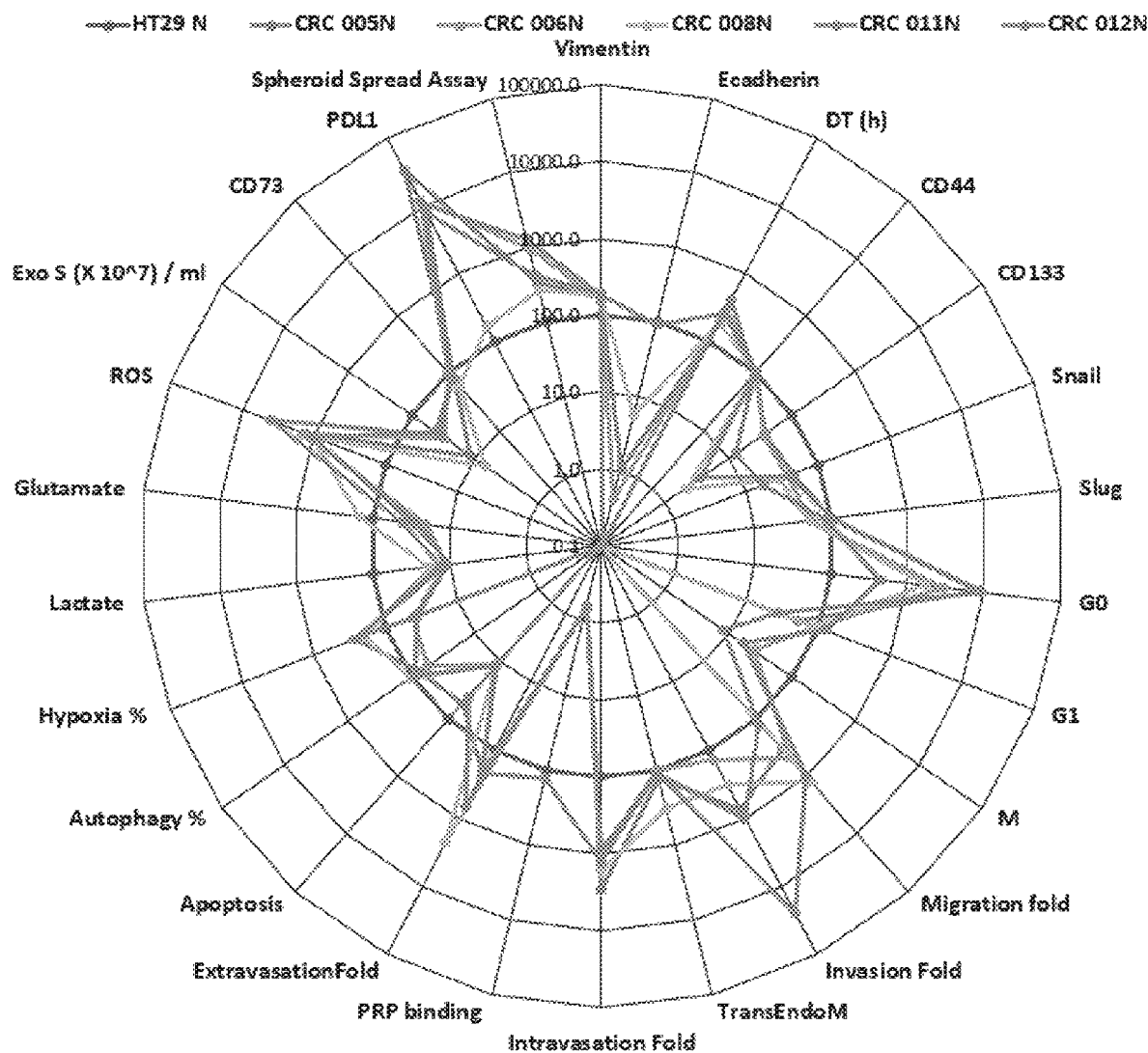
FIG. 26B is a radial chart representation depicting values and correlation of parameter of the assays for five representative patient samples.

FIGS. 24A and 24B are a representation depicting overexpression strategy to convert non-metastatic (non-met) cells to metastatic (met) cell and CRISPR CAS 9 mediated conversion of met to non-met cells respectively, showing vectors construction for genetically engineered cell lines, to increase or decrease PR and metastatic properties, the cell lines were engineered by both constitutive and inducible transfection for overexpression and CRISPR CAS 9 mediated under expression. In an example, genetically engineered cell lines of HT 29: 5 inducible clone, 1 constitutive clone; SW 480: 2 constitutive clones; HCT 116: 2 constitutive clones were used in conducting assays as disclosed herein. FIGS. 25A, 25B, 26A and 26B are radial chart representations depicting values and correlation of parameter of the assays for wild type and engineered cell line, and also representative patient data samples; wherein FIG. 25A depicts values and correlation of parameter of the assays for wild type cell lines, viz. HT 29, HCT 116, SW480 and COLO 205; FIG. 25B depicts values and correlation of parameter of the assays for engineered constitutive and inducible clones of HT29; FIG. 26A depicts values and correlation of parameter of the assays for engineered (by CRISPR CAS9) cell lines; and FIG. 26B depicts values and correlation of parameter of the assays for five representative patient samples.

In addition to generating the initial data sets obtained from the cell lines and patient data set obtained from patient tumor sample, an in vitro inhibitory potency data of multiple compounds can be obtained by screening multiple compounds, can be either approved drugs (repurposing) or novel compound libraries (new drug discovery), on the cancer cell lines to generate a compound dataset. The compound data set is generated by studying the effect of multiple compound(s) on both wild type and genetically engineered tumor cell lines, through A1 to E20, to obtain metastasis inhibitory potency data of compounds. The plasticity ratio (PR) in the epithelial to mesenchymal transition and mesenchymal to epithelial transition is an essential part of the compound data set. The compounds/drugs used for initial proof-of-concept (POC) are all approved drugs, with literature curated information on their efficacy, safety and toxicity along with all pharmacological data.

In step 103, the data sets (comprising of the initial datasets, the patient dataset, and the compound dataset) are used to generate a predictive model. The initial dataset is normalized in accordance with the respective patient dataset (which can be associated with each tumor type). Correlations between the initial dataset and a first output can be generated by assigning a weightage to each of the parameters of the initial dataset for various outputs. The first output gives an indication of whether the tumor is a metastatic tumor (step 104). The metastasis inhibitory potency data of compounds/drugs in the compound dataset is normalized with respect to assigned weightages of parameters of the initial data set and correlations are generated between the initial dataset and a second output. The second output gives an indication of the inhibitory potency of the compounds/drugs (step 105). The compound data set is normalized with respect to the weightages that are assigned/imparted to each parameter during the first normalization of the initial data set, where the patient data sets are used. However, for certain validation cases, the patient sample data set may be used for compounds, but it will be only for validation purposes. The generated correlations are mapped to generate the predictive model, wherein the predictive model defines association(s) between the parameters of the initial dataset and the first and second outputs.

The various actions in method 100 may be performed in the order presented, in a different order or simultaneously. Further, in some embodiments, some actions listed in FIG. 1 may be omitted.

Figure 27:
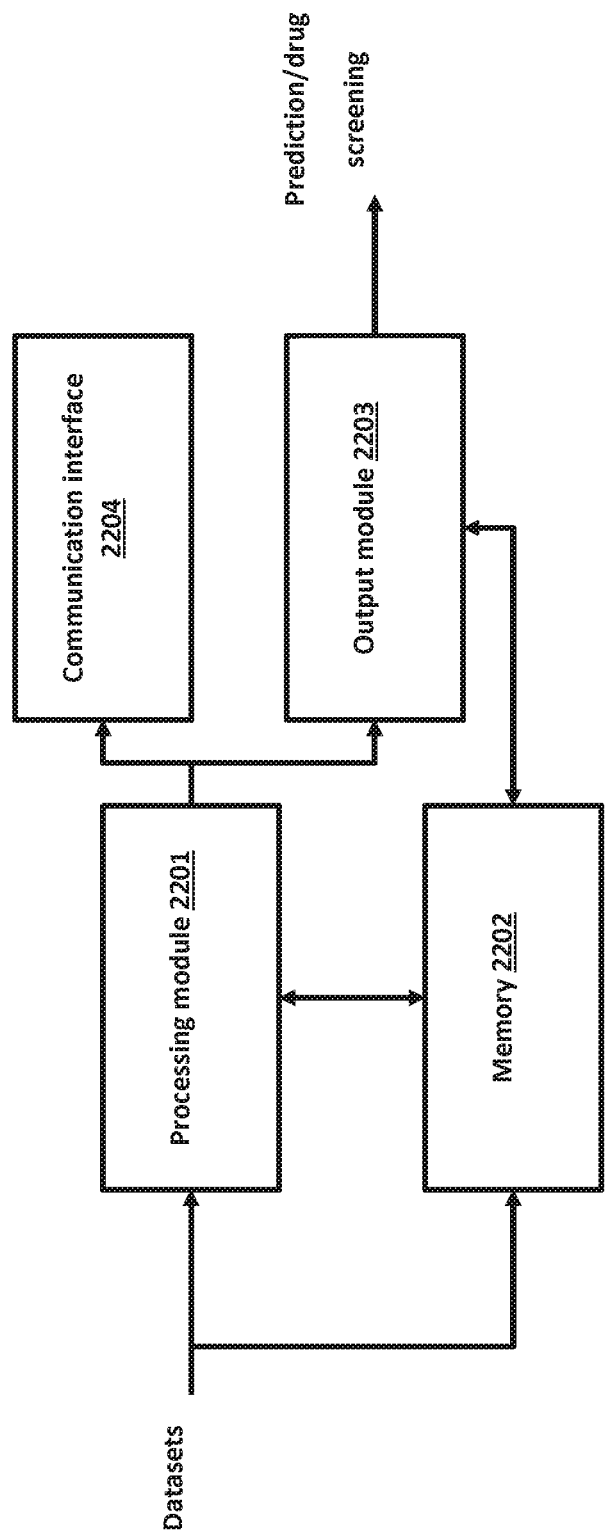
FIG. 27 depicts a system for determining the ability of at least one cancer cell to metastasize and for screening of drugs for their potential use in inhibiting cancer metastasis, according to embodiments as disclosed herein.

FIG. 27 depicts a system for determining the ability of at least one cancer cell to metastasize and for screening of drugs for their potential use in inhibiting cancer metastasis. The system 2200 can identify the metastatic potential of a tumor and identifying compound(s) that have the maximum potency against parameters of the assays with maximum weightages, thereby identifying a combination that would help delay or prevent metastasis in animal models. This would help filter compounds for drug discovery and expedite the discovery screening procedure for candidate drugs. The system 2200, as depicted, comprises a processing module 2201, a memory 2202, an output module 2203, and a communication interface 2204.

The memory 2202 stores at least one of, the initial data set, the patient dataset for each tumor type, the compound dataset, data used by the assays, data generated from the assays, data generated by the processing module 2201, and so on. Examples of the memory 2202 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 2202 may include one or more computer-readable storage media. The memory 2202 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 2202 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The memory 2202 may be present remotely. Examples of the memory 2202 can be, but not limited to, a data server, a file server, the Cloud, and so on.

The processing module 2201 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The processing module 2201 can fetch the initial dataset, the patient dataset associated with each tumor type and the compound dataset from the memory 2202. The processing module 2201 maps the generated correlations to generate a predictive model. Mapping can be done using at least one of a classified supervised model and/or an unsupervised learning, using neuronal networks. The predictive model defines an association between the parameters of the initial dataset and the first and second outputs. The processing module 2201 can receive at least one input value corresponding to at least one parameter of the assay from a user (either directly via the communication interface 2204 or from the memory 2202). The input value is derived from an unknown patient tumor sample. The processing module 2201 can map the received input values into the predictive model and generate a predictive/prescriptive solution. The predictive/prescriptive solution includes probability of a tumor to metastasize and/or inhibitory potency of compound(s)/drug(s).

Figure 28:
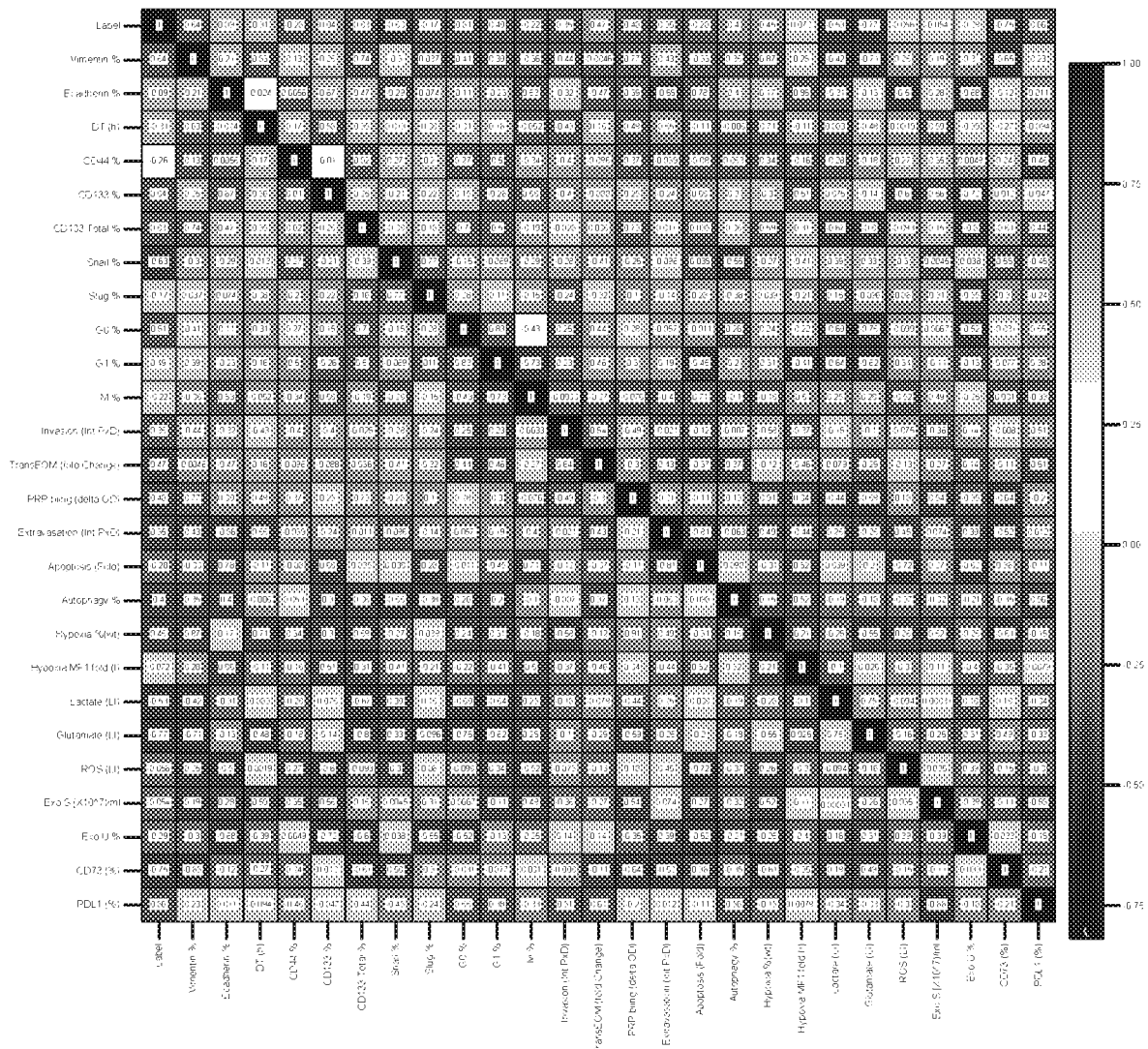
FIG. 28 depicts an example correlation matrix with a heatmap (positive and inverse), according to embodiments as disclosed herein.

The processing module 2201 can normalize the initial dataset, in accordance with the respective patient dataset. The processing module 2201 can generate correlations between the initial dataset and a first output, using classified supervised learning, by assigning a weightage to each of the parameters of the initial dataset for various outputs. The processing module 2201 can generate the correlations between initial dataset and the output by dividing the initial and patient datasets corresponding to each tumor type into the following three sets; a training set; a validation set; and a test set. The training set is a dataset that is used for training the predictive model based on the initial dataset and the patient dataset. The validation set is a dataset which is used to evaluate and improve the trained model. Once the model is completely trained, the test set provides the unbiased evaluation of the model. The predictive model receives the inputs of test data and predicts output without seeing the actual output. After prediction, the model is evaluated by comparing its output with the actual output present in the test set. Thus, validation and test sets are used for minimizing any overfits or underfits in the trained model. FIG. 28 depicts an example correlation matrix with a heatmap (positive and inverse). The first output gives an indication of whether the tumor is a metastatic tumor.

The processing module 2201 can normalize the metastasis inhibitory potency data of compounds in the compound dataset with respect to the assigned weightages of parameters of the initial data set and generate correlations between the initial dataset and a second output via non supervised learning using neuronal networks. The second output gives an indication of the inhibitory potency of the compounds. The processing module 2201 normalizes the compound data set with respect to the weightages that are assigned/imparted to each parameter during the first normalization of the initial data set, where the patient data sets are used. Similarly, for screening of drugs, the processing module normalizes initial dataset relating to each tumor type with respective compound dataset and generates the correlations between initial dataset and the output by dividing the initial and compound datasets corresponding to each tumor type into the following three sets; a training set; a validation set; and a test set. The training set is a dataset that is used for training the predictive model based on the initial and the compound dataset. The validation set is a dataset which is used to evaluate and improve the trained model. Once the model is completely trained, the test set provides the unbiased evaluation of the model. The model receives the inputs of test data and predicts output without seeing the actual output. After prediction, the model is evaluated by comparing its output with the actual output present in the test set. Thus, validation and test sets are used for minimizing any overfits or underfits in the trained model. However, for certain validation cases, the patient sample data set may be used for compounds/drugs, but it will be only for validation purposes.

The communication interface 2204 can enable the system 2200 to communicate with at least one external device, such as the memory 2202. The communication interface 2204 may include at least one of, but is not limited to, a wired network, a value-added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on.

The output module 2203 can enable data generated by the processing module 2201 to be presented to at least one external entity. Examples of the external entity can be, but not limited to, a user, an administrator, and so on. The output module 2203 can store the data generated by the system 2200 in the memory 2202 or any other suitable location. Examples of the output module 2203 can be, but not limited to, a display, a printer, and so on.

The model generated by the processing module 2201 is cancer agnostic; i.e., independent of the tumor type. The correlations used for generating the model are drawn from the individual tumor based models. Thus, the final cancer agnostic model will be able to predict metastasis probability and compound potential with higher sensitivity, as it would be a culmination of iterative cycles of normalization and validation with thousands and thousands of data sets.

It is not practically feasible to correlate all the individual facets of metastasis directly to each other. Some facets are totally independent of each other; for example, angiogenesis and platelet activation, whereas some others can be interconnected, e.g. EMT and MET. Therefore, the processing module 2201 is designed to bin the assays in such way that each bin will have assays whose biology are connected. Any dual inhibitory activity within a bin would be more representative of additive nature, whereas dual inhibition across bins would be more synergistic in nature.

The processing module 2201 generates a sub-model for fitting the dataset contained in each of the bins. The processing module 2201 subsequently analyses these sub-models for specific patterns within the same bins and then creates further patterns connecting different bins. Based on inter-bin pattern interactions, the processing module 2201 generates the cancer agnostic module to make decisions and predictions.

The processing module 2201 may employ Support vector machines, Neural networks, or Deep neural network techniques for assessing the probability of multivariate pattern interactions, to identify the best fit.

The processing module 2201 comprises a self-learning editor. The editor can receive and store dataset relating to unknown tumor samples and corresponding predictions in the repository. The processing module 2201 uses this data to re-train the predictive model for improving its accuracy of predicting the output. The output module 2203 is configured to display the collective score assigned to at least one of the above features indicating the likelihood of cancer metastasis of the patient tumor sample and/or inhibitory potency of compound(s).

FIG. 27 shows exemplary blocks of the system 2200, but it is to be understood that other embodiments are not limited thereon. In other embodiments, the system 2200 may include less or more number of blocks. Further, the labels or names of the blocks are used only for illustrative purpose and does not limit the scope of the embodiments herein. One or more blocks can be combined to perform same or substantially similar function in the system 2200.

Embodiments herein further disclose a method for treatment of metastatic cancer at various stages of metastasis.

The embodiments disclosed herein can be implemented through at least one software program running on at least one hardware device and performing network management functions to control the network elements. The elements include blocks which can be at least one of a hardware devices, or a combination of hardware device and software module.

The embodiment disclosed herein describes methods and systems for determining the ability of at least one cancer cell to metastasize and for screening of compounds/drugs for their potential use in inhibiting cancer metastasis. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the scope of the embodiments as described herein.

We claim:

1. A method for training a predictive model the method comprising:
   a) obtaining an initial datasets from at least one of wild type tumor cell lines, a genetically engineered tumor, a patient dataset associated with a specific tumor type from at least one of wild type tumor cell lines and genetically engineered tumor;
   b) normalizing the initial dataset in accordance with the respective patient dataset;
   c) generating first correlations between the initial dataset and a first output indicative of whether the tumor is a metastatic tumor, by assigning weightages to each parameter of the initial dataset using classified supervised learning and selecting an optimized set of parameters from datasets comprising-chemosensitivity, stemness, adhesion, exosome-uptake, autophagy, migration, angiogenesis, and spheroid formation;
   d) mapping the first correlations by associating the initial dataset and the patient dataset with historical training data to refine the predictive model;
   e) dividing the initial dataset and the patient dataset into a training set, a validation set, and a test set; and
   f) iteratively training, validating, and testing, the predictive model using the training set; and
   g) dynamically adjusting the first correlations based on the assigned weightages using the predictive model.

2. The method, as claimed in claim 1, wherein the initial data-sets is obtained by conducting cell-based assays in at least one of wild type tumor cell lines, genetically engineered tumor-and-moving cell lines and patient dataset.

3. The method, as claimed in claim 2, wherein the cell assays comprise
   group A assays for characterizing cells;
   group B assays for evaluating the ability of the cells to move out of an epithelial layer;
   group C assays for evaluating ability of the tumor cell to enter endothelial system (blood), survive in the endothelial system and migrate from the endothelial system to a secondary site;
   group D assays for evaluating ability of tumor cells to survive in the secondary site, cross talk with the tissue in the secondary site and successfully grow to a tumor in the secondary site; and
   group E extrinsic assays for evaluating the ability of tumor cells to survive oxidative and nutrient stress and remain dormant-;
   wherein group A assays comprise of evaluating chemosensitivity by checking ability of a tumor cell to survive upon treatment with multiple chemotherapeutic drugs;
   epithelial to mesenchymal ratio in a tumor by comparing a total percentage of mesenchymal markers to a total percentage of epithelial markers to generate a Plasticity Ratio (PR), wherein PR is directly proportional to invasiveness and by formation of a spontaneous loose spheroid formation;
   stemness of the cell by analyzing stem cell markers using flow cytometry and immunofluorescence; and
   doubling time of tumor, which is total time taken by the tumor to double number of cells by the tumor and the doubling time is measured by adding a labelled dye into the cells of the tumor and monitoring incorporation of the labelled dye into DNA of the cells;
   wherein group B assays comprise of evaluating
   adhesion by measuring ability of tumor cells to bind to epithelial membranes using synthetic proteins that mimic epithelial membrane proteins;
   migration by measuring ability of tumor cells to move away from the tumor towards a chemoattractant signature using a two chamber system, divided by a permeable tissue culture plate insert, that are laid over a chemoattractant, with the tumor cells being plated on top of the insert; and
   invasion by measuring the ability of tumor cells to tear through the epithelial membrane and move towards the chemoattractant;
   wherein group C assays comprise of evaluating:
   intravasation, which comprises of determining ability of tumor cells to invade through the endothelial layer in the presence of stimuli and ability to cleave through the endothelial membrane, moving towards enriched blood by studying the monolayer formation of the endothelial layer, the integrity of the endothelial layer and measuring the amount of tumor cells that successfully invade through the endothelial layer;
   Tumor Cell Induced Platelet Aggregation (TCIPA), wherein TCIPA is ability of tumor cells to bind with platelets and subsequently activate them and TCIPA is evaluated by measuring change in an optical density of the tumor cell binding with platelets and subsequent platelet aggregation, using a co-culture of Platelet rich plasma (PRP) and tumor cells; and
   extravasation, which is ability of tumor cells to break out of the endothelial layer to an external tissue and is measured by co-incubating the enriched blood and tumor cells together on a permeable tissue culture plate insert, wherein a primary endothelial cell layer is coated on the permeable tissue culture plate insert and checking for integrity of the endothelial cell layer;
   wherein group D assays comprise of evaluating:
   mesenchymal to epithelial transition (MET), which is ability of the tumor cells to change from a moving cellular form back to a growing cellular form by detecting a change in epithelial and mesenchymal cell markers, on treating the cells with agents promoting MET, wherein MET is characterized by measuring the PR ratio using flow cytometry and at least one imaging technique, wherein the imaging technique uses fluorescence markers using multiple proteins as markers;
   apoptosis by checking amount of caspase 3 released by tumor cells;
   energy metabolism of tumor cells by measuring parameters including, but not limited to, lactate consumption, glutamate production, NADH/NADPH and Reactive Oxygen Species (ROS) production; and
   exosome vesicles secretion and uptake, which comprises of measuring ability of the tumor cells to grow in a foreign secondary environment by isolating exosomes and quantitating from cell cultures, of moving and growing cells, and from genetically modified cells, labelling the isolated and quantitated exosomes, and evaluating uptake of exosomes in the cells using the labelled exosomes;
   wherein group E assays comprise of evaluating
   cytotoxicity comprises of detecting low level/early cellular damage by measuring Lactate Dehydrogenase (LDH) activity;
   angiogenesis, which is ability of tumors to form new blood vessels in the secondary site or compounds to inhibit angiogenesis;

immune profiling, which comprises of measuring PD-L1 across epithelial and mesenchymal forms of the cell lines and the primary cells (Percent population change) and measuring CD-73 across epithelial and mesenchymal forms of the cell lines and the primary cells;

autophagy analysis, which comprises of determining how dormant cells survive in a nutrient deficient environment;

effect of hypoxia on different cell types, by induction with cobalt chloride; and cell cycle analysis by Ki67 distinguishing between the GO and M phases, determining dormancy.

4. The method, as claimed in claim 2, further comprising:
h) normalizing metastasis inhibitory potency data of each of the compounds of the compound dataset obtained from a memory with respect to an assigned weightages of each of the parameters of the initial data-set;
i) generating second correlations between the initial dataset and a second output using classified supervised learning and selecting the set of optimized set of parameters from datasets consisting of-chemosensitivity, stemness, adhesion, exosome-uptake, autophagy, migration, angiogenesis, and spheroid formation;
j) dividing the initial dataset and the compound dataset into a training set, a validation set, and a test set; and
k) iteratively training, validating, and testing, mapping-the-generated-correlations-to-generate the predictive model using the training set.

5. A system (2200) of training model, the system (2200) comprising:
a memory (2202); and
a processing module (2201) coupled to the memory (22023) configured to:
i. obtain an initial datasets from at least one of wild-type tumor cell lines, a genetically engineered tumor, a patient dataset, and a compound dataset associated with a specific tumor type from at least one of wild type tumor cell lines and genetically engineered tumor,
ii. normalize the initial dataset in accordance with the respective patient dataset;
iii. generate first correlations between the initial dataset and a first output indicative of weather the tumor is a metastatic tumor, by assigning weightages to each parameter of the initial dataset using classified supervised learning and selecting an optimized set of parameters from datasets comprising-chemosensitivity, stemness, adhesion, exosome-uptake, autophagy, migration, angiogenesis, and spheroid formation;
iv. mapping the first correlations by associating the initial dataset and the patient dataset with historical training data to refine the predictive model;
v. divide the initial dataset and the patient dataset into a training set, a validation set, and a test set; and
vi. iteratively train, validate, and test, determine ability using the predictive model using the training set; and
vii. dynamically adjust the first correlations based on the assigned weightages using the predictive model.

6. The system; as claimed in claim 5, wherein the cell assays are conducted in cell lines and the cell assays comprise
group A assays for characterizing cells;
group B assays for evaluating the ability of the cells to move out of an epithelial layer;
group C assays for evaluating ability of the tumor cell to enter endothelial system (blood), survive in the endothelial system and migrate from the endothelial system to a secondary site;
group D assays for evaluating ability of tumor cells to survive in the secondary site, cross talk with the tissue in the secondary site and successfully grow to a tumor in the secondary site; and
group E extrinsic assays for evaluating the ability of tumor cells to survive oxidative and nutrient stress and remain dormant; and
wherein group A assays comprise of evaluating
chemosensitivity by checking ability of a tumor cell to survive upon treatment with multiple chemotherapeutic drugs;
epithelial to mesenchymal ratio in a tumor by comparing a total percentage of mesenchymal markers to a total percentage of epithelial markers to generate a Plasticity Ratio (PR), wherein PR is directly proportional to invasiveness and by formation of a spontaneous loose spheroid formation;
stemness of the cell by analyzing stem cell markers using flow cytometry and immunofluorescence; and
doubling time of tumor, which is total time taken by the tumor to double number of cells of the tumor and the doubling time is measured by adding a labelled dye into the cells of the tumor and monitoring incorporation of the labelled dye into DNA of the cells;
wherein group B assays comprise of evaluating adhesion by measuring ability of tumor cells to bind to epithelial membranes using synthetic proteins that mimic epithelial membrane proteins;
migration by measuring ability of tumor cells to move away from the tumor towards a chemoattractant signature using a two chamber system, divided by a permeable tissue culture plate insert, that are laid over a chemoattractant, with the tumor cells being plated on top of the insert; and
invasion by measuring the ability of tumor cells to tear through the epithelial membrane and move towards the chemoattractant;
wherein group C assays comprise of evaluating
intravasation, which comprises of determining ability of tumor cells to invade through the endothelial layer in the presence of stimuli and ability to cleave through the endothelial membrane, moving towards enriched blood by studying the monolayer formation of the endothelial layer, the integrity of the endothelial layer and measuring the amount of tumor cells that successfully invade through the endothelial layer;
Tumor Cell Induced Platelet Aggregation (TCIPA), wherein TCIPA is ability of tumor cells to bind with platelets and subsequently activate them and TCIPA is evaluated by measuring change in an optical density of the tumor cell binding with platelets and subsequent platelet aggregation, using a co-culture of Platelet rich plasma (PRP) and tumor cells; and
extravasation, which is ability of tumor cells to break out of the endothelial layer to an external tissue and is measured by co-incubating the enriched blood and tumor cells together on a permeable tissue culture plate insert, wherein a primary endothelial cell layer is coated on the insert and checking for integrity of the endothelial cell layer;
wherein group D assays comprise of evaluating
mesenchymal to epithelial transition (MET), which is ability of the tumor cells to change from a moving cellular form back to a growing cellular form by detecting a change in epithelial and mesenchymal cell markers, on treating the cells with agents promoting MET, wherein MET is characterized by measuring the PR ratio using flow cytometry and at least one imaging technique, wherein the imaging technique uses fluorescence markers using multiple proteins as markers;

apoptosis by checking amount of caspase 3 released by tumor cells;

energy metabolism of tumor cells by measuring parameters including, but not limited to, lactate consumption, glutamate production, NADH/NADPH and Reactive Oxygen Species (ROS) production; and Exosome vesicles secretion and uptake, which comprises of measuring ability of the tumor cells to grow in a foreign secondary environment by isolating exosomes and quantitating from cell cultures, of moving and growing cells, and from genetically modified cells, labelling the isolated and quantitated exosomes, and evaluating uptake of exosomes in the cells using the labelled exosomes;

wherein group E assays comprise of evaluating cytotoxicity comprises of detecting low level/early cellular damage by measuring Lactate Dehydrogenase (LDH) activity;

Angiogenesis, which is ability of compounds to inhibit angiogenesis;

immune profiling, which comprises of measuring PD-L1 across epithelial and mesenchymal forms of the cell lines and the primary cells (Percent population change) and measuring CD-73 across epithelial and mesenchymal forms of the cell lines and the primary cells;

autophagy analysis, which comprises of determining how dormant cells survive in a nutrient deficient environment;

effect of hypoxia on different cell types, by induction with cobalt chloride; and cell cycle analysis by Ki67 distinguishing between the GO and M phases.

7. The system, as claimed in claim 5, wherein the initial data sets comprise data corresponding to the assays for each of growing cell lines, and moving cell lines.

8. The system; as claimed in claim 5, wherein generating the predictive model comprises normalizing the initial dataset in accordance with the patient dataset;

generating correlations between the initial dataset and a first output by assigning a weightage to each of the parameters of the initial dataset for various outputs, wherein the first output gives an indication of whether or not the tumor is a metastatic; and mapping the generated correlations to generate the predictive model.

9. The system; as claimed in claim 5, wherein generating the predictive model comprises normalizing the initial dataset in accordance with assigned weightages of parameters of the initial data set;

generating correlations between the initial dataset and a second output, wherein the second output gives an indication of the inhibitory potency of the compounds; and mapping the generated correlations to generate the predictive model.

10. The system as claimed in claim 5, further comprising:

the processing module (2201) configured to a) normalize metastasis inhibitory potency data of each of the compounds of the compound dataset with respect to the assigned weightages of each of the parameters of the initial dataset;

b) generate second correlations between the initial dataset and a second output using classified supervised learning and selecting the set of optimized set of parameters from datasets comprising-chemosensitivity, stemness, adhesion, exosome-uptake, autophagy, migration, angiogenesis, and spheroid formation;

c) divide the initial dataset and the compound dataset into a training set, a validation set, and a test set; and d) iteratively train, validate, and test, the predictive model using the training set to generate a machine predictive model using the datasets.

* * * * *